(12) United States Patent
Sinnarajah et al.

(10) Patent No.: US 8,989,075 B2
(45) Date of Patent: *Mar. 24, 2015

(54) METHOD AND SYSTEM FOR A MULTICAST SERVICE INITIATION IN A COMMUNICATION SYSTEM

(75) Inventors: Ragulan Sinnarajah, San Diego, CA (US); Jun Wang, San Diego, CA (US); Nikolai K. N. Leung, San Diego, CA (US); Tao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/494,739

(22) Filed: Jun. 12, 2012

(65) Prior Publication Data

US 2012/0257563 A1 Oct. 11, 2012

Related U.S. Application Data

(63) Continuation of application No. 11/097,594, filed on Apr. 1, 2005, now Pat. No. 8,243,644, which is a continuation of application No. 10/192,428, filed on Jul. 9, 2002, now Pat. No. 6,876,636.

(51) Int. Cl.
*H04H 20/71* (2008.01)
*H04W 4/06* (2009.01)
*H04W 72/00* (2009.01)

(52) U.S. Cl.
CPC .............. *H04W 4/06* (2013.01); *H04W 72/005* (2013.01)
USPC .......................................... 370/312

(58) Field of Classification Search
CPC ....... H04L 12/18; H04L 12/185; H04L 45/16;
H04W 4/06; H04W 84/18; H04W 84/02;
H04W 72/00; H04W 72/005; H04W 72/04;
H04W 72/0406; H04W 72/0446
USPC .............. 370/310, 310.2, 312, 315, 321, 328, 370/329, 330, 338, 389, 390
See application file for complete search history.

(56) References Cited

U.S. PATENT DOCUMENTS

| | | |
|---|---|---|
| 4,901,307 A | 2/1990 | Gilhousen et al. |
| 5,103,459 A | 4/1992 | Gilhousen et al. |

(Continued)

FOREIGN PATENT DOCUMENTS

| | | |
|---|---|---|
| CN | 1352494 A | 6/2002 |
| EP | 1213939 A1 | 6/2002 |

(Continued)

OTHER PUBLICATIONS

Taiwan Search Report—TW100122368—TIPO—Aug. 30, 2013.

(Continued)

*Primary Examiner* — Anh Ngoc Nguyen
(74) *Attorney, Agent, or Firm* — John J. Ketchum

(57) ABSTRACT

Method and a system for multicast service notification in cellular telephone system to enable the cellular telephone systems to provide both multicast and point-to-point services are disclosed. Several embodiments describe the signaling interaction between an access network and subscriber stations belonging to a multicast group to allow the access network to properly notify the subscriber stations of a the multicast service. Such a signaling further allows the subscriber stations to recognize the multicast service notification to participate in the multicast service.

47 Claims, 18 Drawing Sheets

(56) References Cited

U.S. PATENT DOCUMENTS

| | | |
|---|---|---|
| 5,392,287 A | 2/1995 | Tiedemann, Jr. et al. |
| 5,457,680 A | 10/1995 | Kamm et al. |
| 5,504,773 A | 4/1996 | Padovani et al. |
| 5,640,442 A | 6/1997 | Fitzgerald et al. |
| 5,655,215 A | 8/1997 | Diachina et al. |
| 5,740,170 A | 4/1998 | Andou et al. |
| 5,802,465 A | 9/1998 | Hamalainen et al. |
| 5,909,651 A * | 6/1999 | Chander et al. ............... 455/466 |
| 5,956,335 A | 9/1999 | Backes et al. |
| 6,577,609 B2 | 6/2003 | Sharony |
| 6,606,502 B1 | 8/2003 | Chung et al. |
| 6,628,629 B1 | 9/2003 | Jorgensen |
| 6,680,922 B1 | 1/2004 | Jorgensen |
| 6,721,290 B1 | 4/2004 | Kondylis et al. |
| 6,728,300 B1 | 4/2004 | Sarkar et al. |
| 6,745,056 B2 | 6/2004 | Wang et al. |
| 6,763,236 B2 * | 7/2004 | Siren ............................ 455/450 |
| 6,804,528 B1 * | 10/2004 | Laroia et al. .................. 455/503 |
| 6,842,461 B2 * | 1/2005 | Harris ........................... 370/465 |
| 6,876,636 B2 | 4/2005 | Sinnarajah et al. |
| 6,980,820 B2 | 12/2005 | Sinnarajah et al. |
| 7,075,904 B1 | 7/2006 | Manish et al. |
| 7,236,465 B2 | 6/2007 | Banerjee et al. |
| 8,243,644 B2 | 8/2012 | Sinnarajah et al. |
| 2002/0035730 A1 | 3/2002 | Ollikainen et al. |
| 2002/0181423 A1 | 12/2002 | Chen et al. |
| 2003/0100325 A1 | 5/2003 | Paila et al. |
| 2003/0134655 A1 | 7/2003 | Chen et al. |
| 2003/0211855 A1 | 11/2003 | Sarkkinen et al. |

FOREIGN PATENT DOCUMENTS

| | | |
|---|---|---|
| JP | 2001320324 A | 11/2001 |
| JP | 2002026987 A | 1/2002 |
| TW | 437212 B | 5/2001 |
| TW | 474076 B | 1/2002 |
| WO | 0108431 A1 | 2/2001 |
| WO | 0163808 A1 | 8/2001 |

OTHER PUBLICATIONS

3GPP: 3G TS 25.211 "Physical channels and mapping of transport channels onto physical channels (FDD)", Version 5.1.0, Release 5, Jun. 2002.

3GPP: 3G TS 25.214 "Physical layer procedures (FDD)", Version 5.1.0, Release 5, Jun. 2002.

3GPP TS 25212 Version 510 Release 5: Universal Mobile Telecommunications System (UMTS); Multiplexing and channel coding (FDD)(Jun. 2002).

3GPP TS 25213 Version 510 Release 5: Universal Mobile Telecommunications System (UMTS); Spreading and modulation (FDD)(Jun. 2002).

3GPP2 C.S0002-0, Version 1.0, Jul. 1999, Physical Layer Standard for cdma2000 Spread Spectrum Systems, TR-45.5 (cdma2000 standard).

Chen, Tao et al., "CDMA2000 Broadcast/Multicast Services Stage 2; Higher Layer Design, Version 0.03," 3GPP2 TSG-P Contribution, 2001, P00-20011203-006R1.

International Search Report—PCT/US03/21597, International Srearch Authority—European Patent Office—Nov. 25, 2003.

Mangione-Smith B: "Low power communications protocols: paging and beyond" Low Power Electronics, 1995., IEEE Smposium on San Jose, CA, USA Oct. 9-11, 1995, pp. 8-11, XP010154308.

Taiwan Search Report—TW092118782—TIPO—Jan. 4, 2011.

Telecommunications Industry Association, Mobile Station-Base Station Compatibility Standard for Dual-Mode Wideband Spread Spectrum Cellular System, TIA/EIA-95, Jul. 1993, 668 pages.

Walton R. et al: "Better Stronger Faster" Communications, Jan. 1994, pp. 29-31, XP000669778.

* cited by examiner

METHOD AND SYSTEM FOR A MULTICAST SERVICE INITIATION IN A COMMUNICATION SYSTEM

CLAIM FOR PRIORITY UNDER 35 U.S.C. §120

The present Application for Patent is a Continuation of patent application Ser. No. 11/097,594 entitled "METHOD AND SYSTEM FOR A MULTICAST SERVICE INITIATION IN A COMMUNICATION SYSTEM" filed Apr. 1, 2005, pending, which is a Continuation of patent application Ser. No. 10/192,428 entitled "METHOD AND SYSTEM FOR A MULTICAST SERVICE INITIATION IN A COMMUNICATION SYSTEM" filed Jul. 9, 2002, issued as U.S. Pat. No. 6,876,636 on Apr. 5, 2005, each of which is assigned to the assignee hereof and is hereby expressly incorporated by reference herein in its entirety.

BACKGROUND

1. Field

The present invention relates to multicast communications, in a wireline or a wireless communication system. More particularly, the present invention relates to a system and method for a multicast service initiation in such a communication system.

2. Background

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier wave is confined within the communication channel bandwidth. At the destination station, the original information signal is reconstructed from the modulated carrier wave received over the communication channel. In general, such a reconstruction is achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent access of relatively short duration rather than continuous access to the common communication channel. Several multiple-access techniques are known in the art, such as time division multiple-access (TDMA), and frequency division multiple-access (FDMA). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice traffic and/or data traffic. An example of a communication system carrying both voice and data traffic is a system in accordance with the IS-95 standard, which specifies transmitting voice and data traffic over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data traffic or voice traffic is partitioned into code channel frames that are 20 milliseconds wide with data rates as high as 14.4 Kbps. Additional examples of communication systems carrying both voice and data traffic comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple-access wireless communication system, communications between users are conducted through one or more base stations. The term user refers to both animate and inanimate entities. A first user on one wireless subscriber station communicates to a second user on a second wireless subscriber station by conveying information signal on a reverse link to a base station. The base station receives the information signal and conveys the information signal on a forward link to the second subscriber station. If the second subscriber station is not in the area served by the base station, the base station routs the data to another base station, in whose service area the area the second subscriber station is. The second base station then conveys the information signal on a forward link to the second subscriber station. The forward link refers to transmission from a base station to a wireless subscriber station and the reverse link refers to transmission from a wireless subscriber station to a base station. Likewise, the communication can be conducted between a first user on a wireless subscriber station and a second user on a landline station. A base station receives the data from the first user on the wireless subscriber station on a reverse link, and routes the data through a public switched telephone network (PSTN) to the second user on a landline station. In many communication systems, e.g., IS-95, W-CDMA, IS-2000, the forward link and the reverse link are allocated separate frequencies.

The above described wireless communication system is an example of a point-to-point service, where information from the first user is intended for the second user only. In contrast, a multicast service is a service where the information provided by a source, a user or a content server, is intended for a subset of all users. A model of a multicast system comprises a selected group of users, defined by the user's group membership. The group membership comprises users of subscriber stations subscribed to a particular multicast content. For brevity, the term "member subscriber station" is used to mean "user on a subscriber station" unless stated otherwise.

In one such a model the member subscriber stations are provided information with a certain content, e.g., news, movies, sports events and the like by one or more content servers via an assess network. The term access network is used herein to mean a collection of base stations and one or more base stations' controllers. Each member subscriber station monitors a forward link channel, over which the information is conveyed. The forward link channel may be shared among the member subscriber stations or may be established between each member subscriber station and the access network's station, e.g., a base station serving the member subscriber station. Because the content server fixedly determines the content, the member subscriber stations are generally not communicating back to the access network.

Alternatively, the source of information is a user, a member of the selected group; the user providing information intended for the remaining members of the selected group. If the user wishes to provide information, the user notifies the communication system, e.g., by pressing a push-to-talk (PTT) button. Typically, the user provided information is routed from the subscriber station to a base station on a dedicated reverse link. The base station then conveys the user provided information over a multicast forward link. As in case of the point-to-point communication system, the multicast communication system allows both landline and wireless subscriber station to access the system. The above-described service is also referred to as a group service. Examples of group service communication systems include dispatch services, such as local police radio systems, taxicab dispatch systems, Federal Bureau of Intelligence and Secret Service operations, and general military communication systems.

The above-mentioned multicast service communication systems are generally highly specialized purpose-build communication systems. With recent advancements in wireless cellular telephone systems there has been an interest in utilizing the existing infrastructure of the (mainly point-to-point) cellular telephone systems for multicast services. (As used herein, the term "cellular" systems encompasses both cellular and PCS frequencies.)

Introduction of a multicast services to cellular telephone systems requires integration of multicast services with the point-to-point services provided by the current cellular telephone systems. Specifically, both the access network and the subscriber station need to be able support functions allowing both the multicast mode and point-to-point communication mode. Because the point-to-point cellular telephone systems do not support multicast services, there is a need in the art for a method and a system for a multicast service procedures, specifically a multicast service initiation.

SUMMARY

Embodiments disclosed herein address the above stated needs by determining a multicast group identifier; and including the multicast group identifier in at least one periodically repeated message on a first channel. The subscriber station monitors the periodically repeated message on the channel; and decoding the periodically repeated message to determine if a multicast service notification was included in the periodically repeated message.

In another embodiment the above stated needs are addressed by determining identity of subscriber stations belonging to a multicast group; determining a slot of a channel in accordance with the identity of a subscriber station; and transmitting a multicast service notification in the slot on a channel. The subscriber station monitors the slot of a channel; and decodes the message conveyed in the slot to determine if a multicast service notification was included in the message.

In another embodiment the above stated needs are addressed by including an indicator into a pre-determined slot on a first channel; and including a multicast service notification into a message conveyed in a slot on a second channel, the slot corresponding to the pre-determined slot on the first channel, if a multicast service notification was indicated by the indicator. The subscriber station decodes the indicator from the pre-determined slot on the first channel; and decodes the multicast service notification in the slot on the second channel, the slot corresponding to the pre-determined slot on the first channel, if the multicast service notification was indicated by the indicator.

In another embodiment the above stated needs are addressed by including an indicator into a first slot on a first channel; and including a multicast service notification into a message conveyed in a second slot on a second channel, the second slot corresponding to the first slot, if a multicast service notification was indicated by the indicator. The subscriber station decodes the indicator from the first slot on the first channel; and decodes the multicast service notification in the second slot on the second channel, the second slot corresponding to the first slot, if the multicast service notification was indicated by the indicator.

In another embodiment the above stated needs are addressed by establishing a link layer protocol between a subscriber station belonging to a multicast group and a source of a multicast service; and conveying the multicast service notification over the link layer protocol. The subscriber station participates in establishing the link layer protocol; and receives the multicast service notification over the link layer protocol.

DETAILED DESCRIPTION

Figure 1:
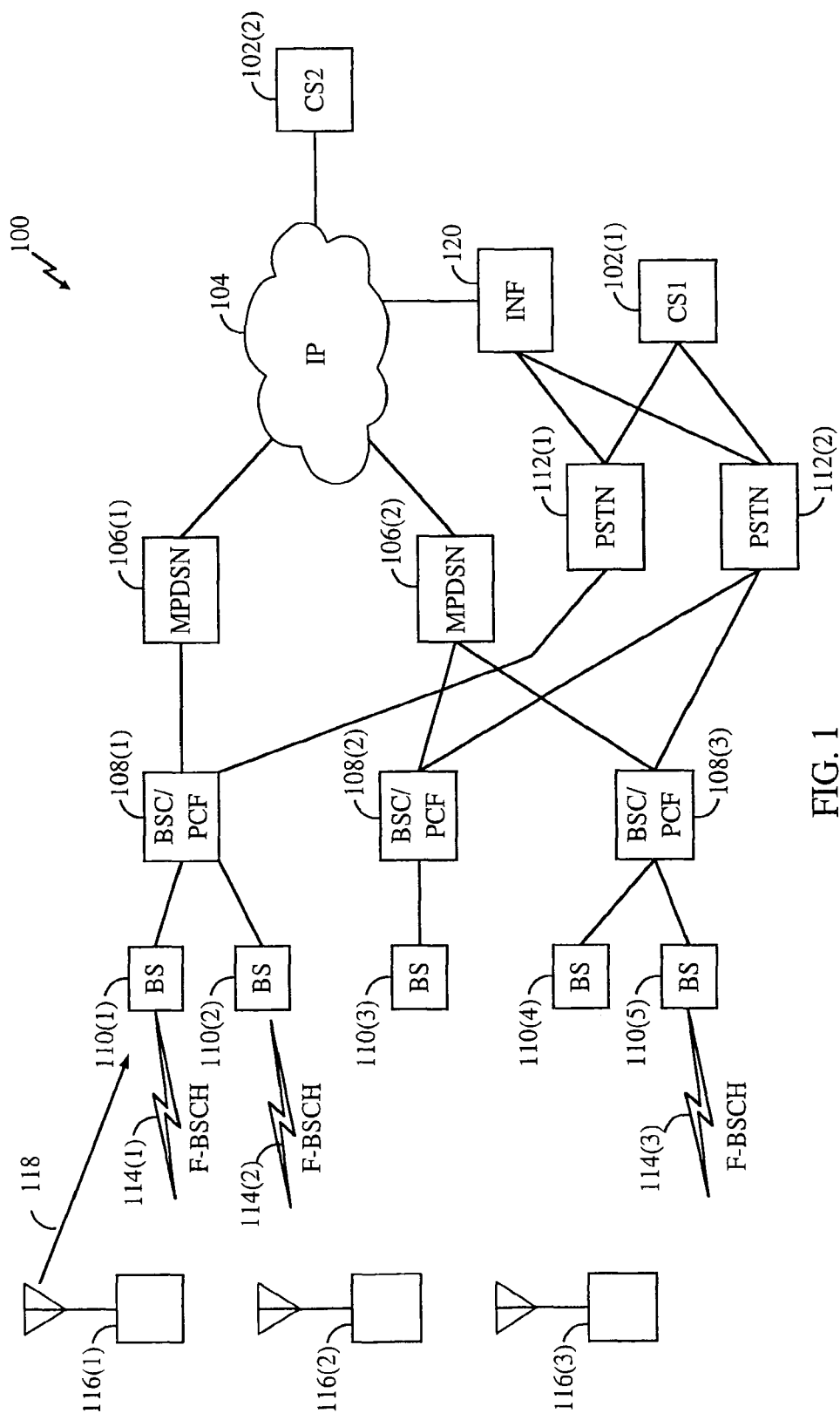
FIG. 1 illustrates a conceptual block diagram of a communication system capable of providing multicast services in accordance with embodiments of the present invention.

The word "exemplary" is used herein to mean "serving as an example, instance, or illustration." Any embodiment described herein as "exemplary" is not necessarily to be construed as preferred or advantageous over other embodiments.

The terms point-to-point communication is used herein to mean a communication between two subscriber stations over a dedicated communication channel.

The terms group service, point-to-multipoint communication, push-to-talk, or dispatch service are used herein to mean a communication wherein a plurality of subscriber stations are receiving communication from—typically—one subscriber station.

The term access network is used herein to mean a collection of base stations (BS) and one or more base stations' controllers. The access network transports data packets between multiple subscriber stations. The access network may be further connected to additional networks outside the access network, such as a corporate intranet or the Internet, and may transport data packets between each access terminal and such outside networks.

The term base station is used herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station is used herein to mean the hardware with which an access network communicates. A subscriber station may be mobile or stationary. A subscriber station may be any data device that communicates through a wireless channel or through a wired channel, for example using fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term physical channel is used herein to mean a communication route over which a signal propagates described in terms of modulation characteristics and coding.

The term logical channel is used herein to mean a communication route within the protocol layers of either the base station or the subscriber station.

The term communication channel/link is used herein to mean a physical channel or a logical channel in accordance with the context.

The term reverse channel/link is used herein to mean a communication channel/link through which the subscriber station sends signals to the base station.

A forward channel/link is used herein to mean a communication channel/link through which a base station sends signals to a subscriber station.

As discussed, a model of a multicast system comprises a selected group of users, defined by the user's group membership. The group membership comprises users of subscriber stations subscribed to a particular multicast content. One or more content servers or another user provides the multicast content. FIG. 1 illustrates a conceptual diagram of a communication system 100 capable of providing multicast services (also referred to as a multicast call), in accordance with embodiments of the present invention.

As discussed, the multicast content may originate at a content server (CS). The content server may be located within the network, CS1 102(1), or outside Internet (IP) 104, CS2 102(2). The content may be delivered in a form of packets to a multicast packet data-serving node (MPDSN) 106. The term MPSDN is used because although the MPDSN may be physically co-located or provide functionality identical to the regular PDSN (not shown), the MPSDN may be logically different from a regular PDSN. According to the packet's destination, the MPDSN 106 delivers the packets to a packet control function (PCF) 108. The PCF is a control entity controlling function of base stations 110 for any packet data services including the multicast packet data services like a base station controller is for regular voice traffic and data traffic services. To illustrate the connection of the high level concept of the multicast packet data services with the physical access network, FIG. 1 shows that the PCF is physically co-located, but logically different from a base station controller (BSC). One of ordinary skills in the art understands that this is for pedagogical purposes only. The BSC 108 provides the packets to base stations 110. Although the term base station is used, one of ordinary skills in the art recognizes that the embodiments are equally applicable to sectors.

Similarly, if the content originates in the CS 102(1), the content may be delivered to a public switched telephone network (PSTN) 112. According to the content destination, the PSTN 112 delivers the content to base station controller BSC 108. The BSC 108 provides the content to base stations 110.

In yet another embodiment, the content, originating in the CS 102(1) may be delivered in the form of packets via an interworking function 120 to the PSTN 112. According to the content destination, the PSTN 112 delivers the content to base station controller BSC 108. The BSC 108 provides the content to base stations 110.

The base station 110 provides the content over a forward channel 114 to the member subscriber stations. As discussed, the forward channel may be shared among the member subscriber stations or established between each member subscriber station and the base station, serving the member subscriber station. A use of a shared forward channel is disclosed in a co-pending U.S. patent application Ser. No. 10/113,257, entitled " METHOD AND APPARATUS FOR POINT-TO-MULTIPOINT SERVICES PROVIDED IN COMMUNICATION SYSTEMS", filed Mar. 28, 2002. The use of common and dedicated channels for information broadcast is disclosed in a co-pending U.S. patent application Ser. No. 10/113,098, entitled "METHOD AND APPARATUS FOR CHANNEL MANAGEMENT FOR POINT-TO-MULTIPOINT SERVICES IN A COMMUNICATION SYSTEM", filed Mar. 28, 2002, and assigned to the assignee of the present invention. However, one of ordinary skills in the art understands that recited applications are for tutorial purposes only, and other communication systems utilize channels performing similar function, therefore, the teaching is applicable to other communication systems.

Alternatively, a member subscriber station, e.g., member subscriber station 116(1), communicates multicast content to other member subscriber stations, e.g., a member subscriber station 116(2), via an access network. The member subscriber station 116(1), communicates the multicast content to the group over a reverse link channel 118, assigned to the subscriber station 116(1) by the access network. Reverse link channel assignment is well known in the art, refer e.g., to the above mentioned applications Ser. Nos. 10/113,257 and 10/113,098. The base station 110(1) routes the received information to the base station 110(2), and the base station 110(2) then transmit the routed information over the forward channel 114(2) to the member subscriber station 116(2).

When a multicast service is to be provided, a procedure enabling a multicast call commencement must be followed. Such a procedure may be separated into several stages. During the first stage, member subscriber stations for whom the multicast service is to be provided must be notified. During the next (optional) stage, the interested member subscriber stations respond to the notification. During the next stage, a channel over which the content will be conveyed is selected and assigned.

Notification of Multicast Call Commencement

As discussed above, when a multicast call is to be initiated, the subscriber stations that are members of the multicast group must be notified.

In one embodiment, the access network initiates the multicast call by broadcasting the notification information to the subscriber stations via a periodically transmitted message, e.g., an overhead message. The term overhead message is used herein to mean a message pertaining to system parameters, periodically transmitted by each sector. The overhead message, containing the multicast call notification is transmitted by the sectors, whose coverage area contains member subscriber stations, on a forward channel that is monitored by all subscriber stations not engaged in another call. An example of such an arrangement in a communication system in accordance with the IS-2000 standard is an overhead message transmitted on a forward paging channel (F-PCH) or a forward broadcast control channel (F-BCCH).

The multicast call is advertised by including an identifier of the multicast group (GROUP_ID), for whose member subscriber stations the multicast call is intended, into the overhead message. If more than one multicast call is being initiated, the overhead message contains the identifiers of all the multicast groups, for which the multicast calls are intended. The identifier may be sent in one overhead message; several overhead messages, or be included in all overhead messages for the duration of the multicast call. The last option allows subscriber stations to join already pending multicast call. If the identifier is included in the overhead message for the duration of the multicast call, upon termination of a multicast call for a specific multicast group, the specific multicast group identifier is removed from the message. In addition to the identifier, the overhead message may provide further information relevant to the advertised multicast call, e.g., the type of traffic channel assignments, type of bearer transport used, and other relevant information known to one of ordinary skills in the art. Of course, the remaining parts of the overhead message comprise system related information as discussed above.

Figure 2:
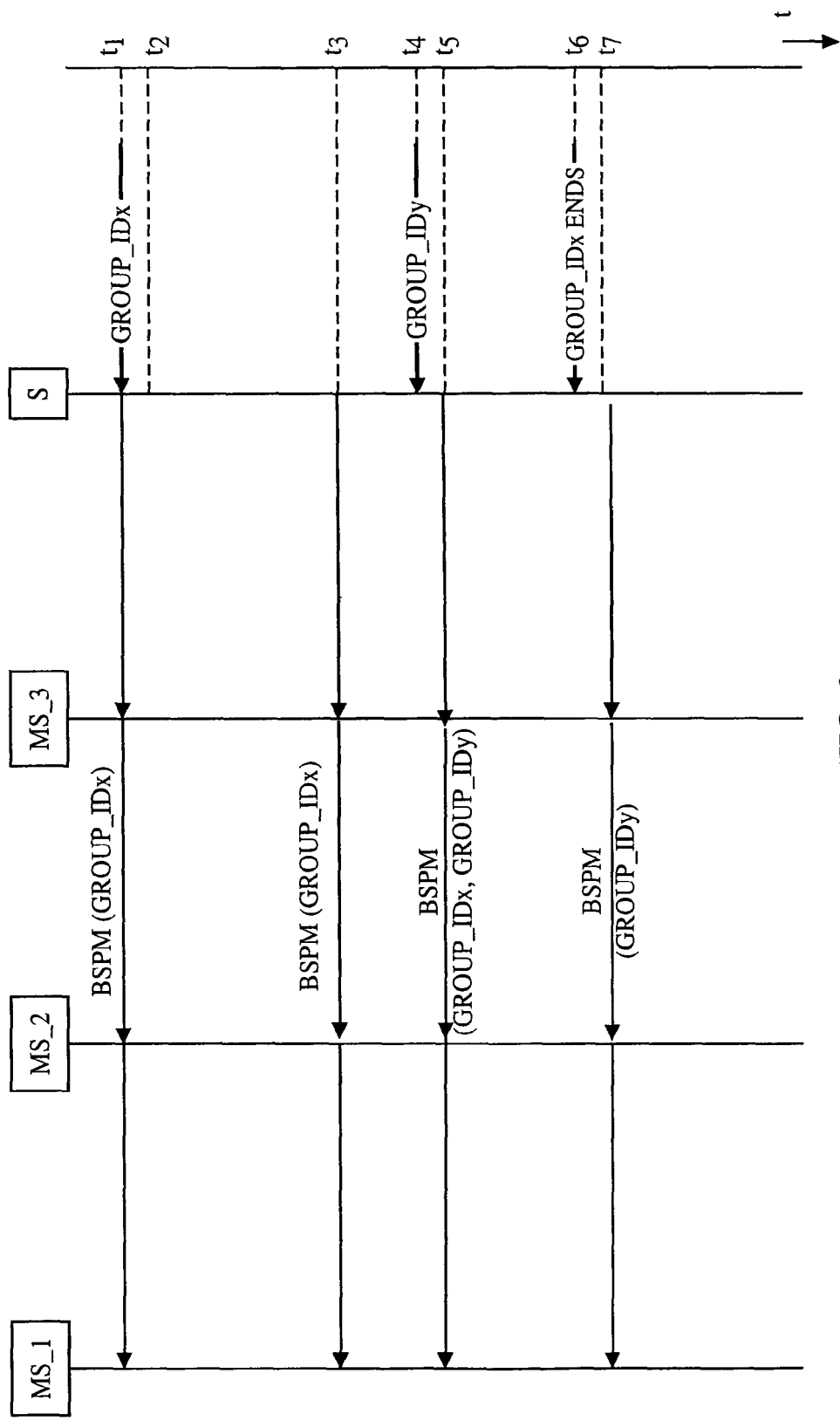
FIG. 2 illustrates a message flow in accordance with one embodiment of notification.

An example of message flow in accordance with the above-described embodiment is illustrated in FIG. 2. At an instant $t_1$, a sector S receives an indication GROUP_IDx that a multicast call intended for group with an identifier GROUP_IDx is to start. The indication may be provided by another entity of the communication system, e.g., a base station controller, a PSTN, a source of information (not shown), an other entities. Alternatively, the sector S receives identity of the subscriber stations MS_1 and MS_2. The sector S then determines the identifier of the multicast group GROUP_IDx comprising the subscriber stations MS_1 and MS_2, e.g., by querying a database. As discussed, the source of information may comprise, e.g., a server, another subscriber station, or any other source known to one skilled in the art. The sector S includes the identifier in the overhead message, which in one embodiment comprises a broadcast system parameters message BSPM(GROUP_IDx), and broadcasts the BSPM (GROUP_IDx) at time $t_2$. Subscriber stations MS_1 and MS_2 that are members of the group with the identifier receive the BSPM(GROUP_IDx) and take an appropriate action, e.g., start monitoring the physical channel on which the identified multicast call is being transmitted, to transmit a response to the access network, to notify the user, and other actions in accordance with design of a specific communication system. FIG. 2 shows an embodiment, in which the identifier is included in the overhead message for the duration of the multicast call. Because the overhead message BSPM repeats periodically, the identifier is, likewise, transmitted in the next instance(s) of the overhead message BSPM. Only one instance at time $t_3$ is shown.

At an instant $t_4$, the sector S receives an indication GROUP_IDy from a source of information (not shown) that a multicast call intended for group with an identifier GROUP_IDy is to start. The sector S includes the identifier into the overhead message, e.g., the BSPM. Because two groups are being notified about the multicast call, the broadcasted overhead message transmitted at an instant $t_5$ contains both identifiers BSPM(GROUP_IDx, GROUP_IDy). Subscriber station MS_3 that is a member of the group with the identifier GROUP_IDy receives the overhead message BSPM(GROUP_IDx, GROUP_IDy), and takes an appropriate action as described above.

At an instant $t_6$, the sector S receives an indication GROUP_IDx ends from the source of information (not shown) that a multicast call intended for group with an identifier GROUP_IDx is to terminate. The sector S removes the identifier from the overhead message, e.g., the BSPM, and broadcasts the overhead message, containing only the identifier GROUP_IDy, BSPM(GROUP_IDy), at an instant $t_7$. Subscriber stations MS_1 and MS_2 that are members of the group with the identifier GROUP_IDx receive the overhead message BSPM(GROUP_IDy), and take an appropriate action, e.g., to terminate monitoring the physical channel on which the multicast call corresponding to the identifier GROUP_IDy is being transmitted. The multicast call BSPM (GROUP_IDy) is unaffected and continues until terminated. Upon termination, the identifier GROUP_IDy is removed from the BSPM.

Figure 3:
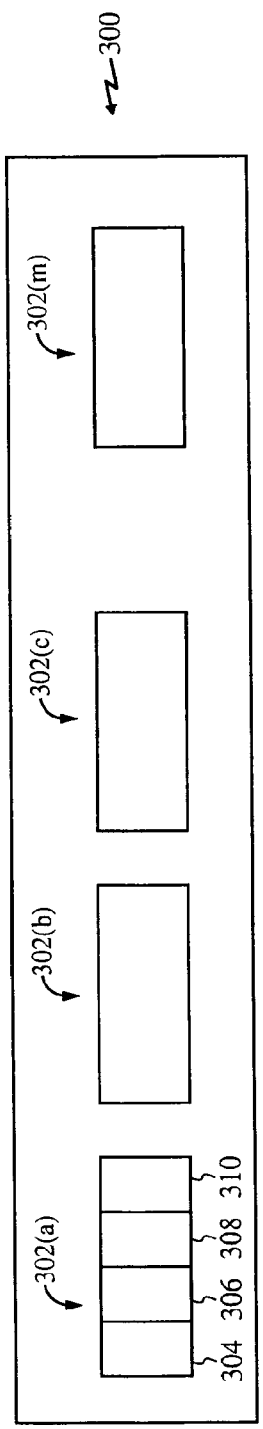
FIG. 3 illustrates conceptual diagram of a page message.

Because the broadcast message is repeated periodically, subscriber stations can join the call anytime after the start of the call. To prevent the broadcast message from affecting the paging channel capacity, it is desirable to limit the broadcast message length. Consequently, the number of groups that may be included in the broadcast message is limited. Additionally, because the broadcast message changes with each call start and termination, the subscriber stations must monitor every update of the broadcast message. In another embodiment, each subscriber station that is a member of a multicast group is notified about a start of a multicast call by an individual message addressed to the subscriber station. In one embodiment, the individual message comprises an individual multicast page (MCP). The concept of an individual MCP is explained in the context of a communication system in accordance with the IS-2000 standard. As conceptually illustrated in FIG. 3, a page message 300 may carry many pages 302, each destined for a different subscriber station or group of subscriber stations. The page message 300 may comprise, e.g., a general page message (GPM) or universal page message (UPM) because either the GPM or the UPM can carry different page record types. The page message is conveyed over the F-PCH or a forward common control channel (F-CCCH). The individual pages 302 carried in a page message are referred to as page record types, each page record type comprising an address of the destined subscriber station (s) 306, a type of the page 308 (i.e., individual or broadcast), a content 310 (i.e., the service option of the call), and other information, e.g., sequence number 304. The addressing is specified in a page address type (ADDR_TYPE), e.g., a Temporary Mobile Station Identifier (TMSI), an international mobile station identifier (IMSI), for individually addressing a subscriber station, or an address type for addressing all subscriber stations. Upon receiving the page message 300, the subscriber station decodes address 306 to determine whether the page 302 is intended for the subscriber station or not. If the address 306 indicates that the page 302 is intended for the subscriber station, the subscriber station decodes the type 308 to determine the type of call, and the content 310, to determine the details of the call. Each type of a call, i.e., a voice call, a data call, an SO33 call in a point-to-point communication system has a corresponding page record. Because, as discussed, the multicast call is a new type of a call, the individual MCP must be defined as a new page record type.

The multicast call is advertised by including an identifier of the multicast group (GROUP_ID) into the individual MCP. The individual MCP is included in a page message and sent over a forward channel, e.g., the F-PCH or the F-CCCH, to the member subscriber stations, using the member subscriber stations' specific address. Additionally, the MCP may provide further information relevant to the advertised call, e.g., the type of traffic channel assignments, type of bearer transport used, and other relevant information known to one of ordinary skills in the art.

Figure 4:
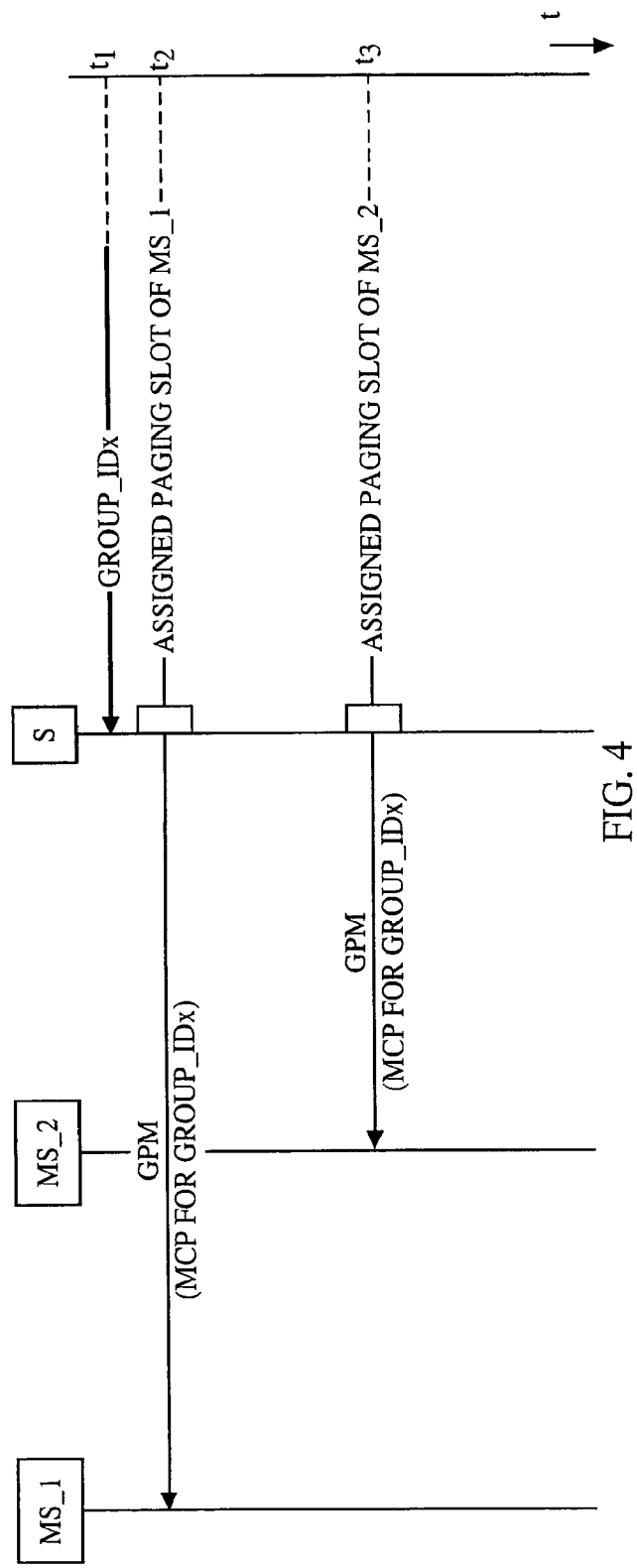
FIG. 4 illustrates a message flow in accordance with another embodiment of notification.

An example of message flow in accordance with the above-described embodiment is illustrated in FIG. 4. At an instant $t_1$, a sector S receives an indication GROUP_IDx that a multicast call intended for group with an identifier GROUP_IDx is to start. The indication may be provided by another entity of the communication system, e.g., a base station controller, a PSTN, a source of information (not shown), an other entities. The sector S then determines the identity of the subscriber stations MS_1 and MS_2, e.g., by querying a database. Alternatively, the sector S receives identity of the subscriber stations MS_1 and MS_2. The sector S then creates an individual MCP containing the identifier GROUP_IDx for subscriber stations MS_1 and MS_2.

One of ordinary skills in the art appreciates that a paging channel may operate in a slotted or non-slotted paging mode because such modes are described in documents known to ordinarily skilled artisans. As an example, such modes are described in the IS-95 standard, U.S. Pat. No. 5,392,287, entitled "METHOD AND APPARATUS FOR REDUCING POWER CONSUMPTION IN A MOBILE COMMUNICATION RECEIVER," issued Feb. 21, 1995, assigned to the assignee of the present invention. For tutorial purposes FIG. 4 illustrates a configuration communication system, in which the subscriber stations monitor the F-PCH or the F-CCCH in a slotted mode; however, one of ordinary skills in the art would understand that a non-slotted mode may be used. As one of ordinary skills in the art understands, the term slot refers to a partition of a physical channel with a length expressed in time, number of chips or other appropriate unit.

The sector S waits until time $t_2$ for the paging slot assigned to the subscriber station MS_1, and then conveys the individual MCP for MS_1 as part of a page message, e.g., the GPM, as shown. The subscriber station MS_1 then may take an appropriate action, e.g., to initiate monitoring the physical channel on which the multicast call corresponding to the identifier GROUP_IDx is being transmitted, to transmit a response, to notify the user, and other actions in accordance with design of a specific communication system. The sector S then waits until time $t_3$ for the paging slot assigned to the subscriber station MS_2, and then conveys the MCP for MS_2 as part of a page message, e.g., the GPM, as shown. The subscriber station MS_2 then may take an appropriate action, as described above. In another embodiment, each member subscriber station is notified about a start of a multicast call by a common message addressed to the subscriber stations belonging to the group. In one embodiment, the common message comprises a common multicast page (MCP). As explained above, because the common MCP is intended for a multiple, but not all, subscriber stations, and because the multicast call is a new type of a call, the common MCP must be defined as a new page record type. Referring to the structure of a page message 300 in FIG. 3 the new page record type 302 comprises a new page address, multicast address (MC_ADDRESS) 304, specifying that the page record type 302 is intended for a multiple subscriber stations, as well as the type 308, the content 310, and other information, e.g., sequence number 304.

Figure 5:
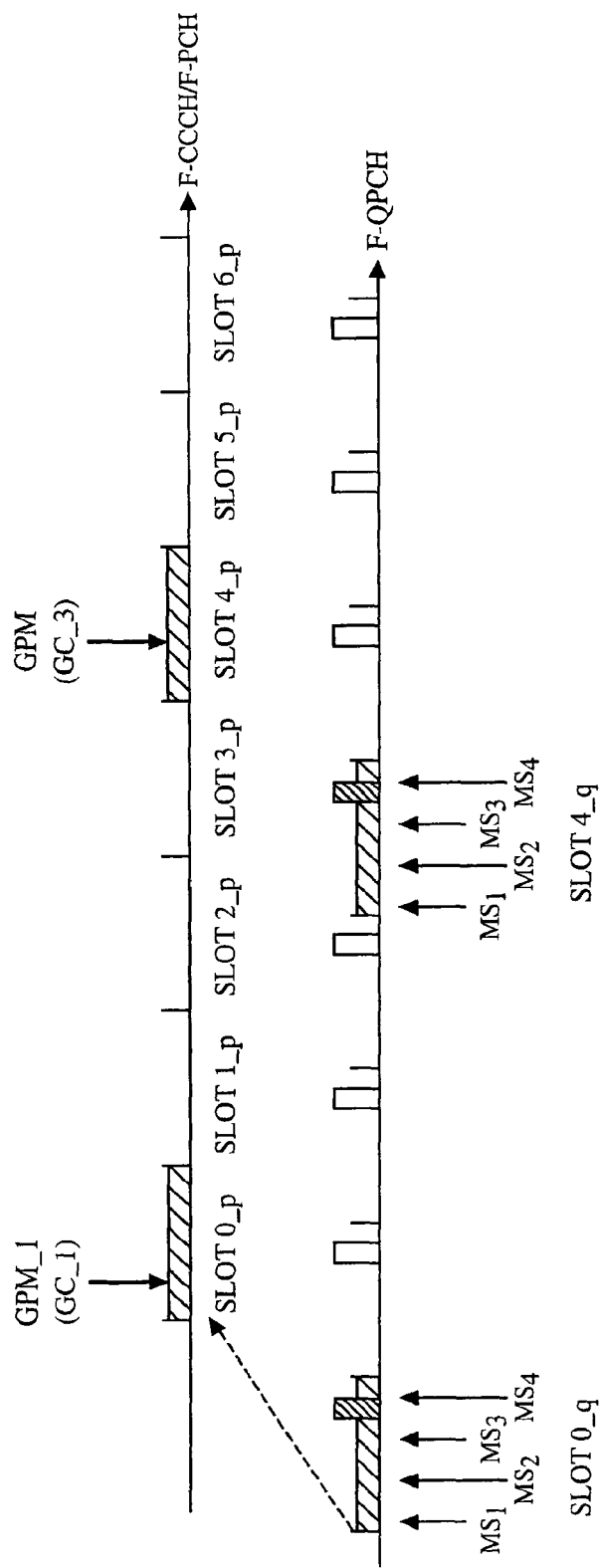
FIG. 5 illustrates a relationship between signaling conveyed over a Forward Quick paging channel and signaling conveyed over a Forward Common Control Channel or a Forward Paging Channel in one embodiment.

The start of a new multicast call is advertised by including an identifier of the multicast group GROUP_ID, into the MCP for the member subscriber stations, belonging to the multicast group identified by the GROUP_ID. The common MCP is included in a page message and sent over a forward channel, e.g., the F-PCH or the F-CCCH, to the subscriber stations for which the common MCP is intended, using the MC_ADDRESS. Additionally, the MCP may provide further information relevant to the advertised call, e.g., the type of traffic channel assignments, type of bearer transport used, and other relevant information known to one of ordinary skills in the art. However, as explained above, in current communication systems, a subscriber station is assigned to monitor a paging channel slot in which a page for the subscriber station is to be sent. However, the subscriber stations belonging to the group identified by the GROUP_ID are not necessarily assigned the same slot on the paging channel. Furthermore, the entity, responsible for paging, e.g., a base station controller (BSC) may not know which subscriber stations are members of a particular multicast group, consequently, the BSC cannot perform the mapping between an individual subscriber station and the MC_ADDRESS. Such a scenario occurs e.g., when multicast service is provided over Internet protocol (IP) because the MCP is triggered due to receiving an IP packet over a multicast IP address. Therefore, a method enabling efficient method for delivering the multicast call initiation information is required. Consequently, in accordance with one embodiment, the common MCP is sent in the first slot of a broadcast paging cycle (BPC). The concept of BPC is explained in terms of a paging channel as implemented in a communication system in accordance with the IS-2000 standard. As illustrated in FIG. 5, the F-PCH and the F-CCCH are divided into slots. To enable periodic broadcast paging, a broadcast paging cycle is defined in terms of duration (in number of F-PCH/F-CCCH slots) given as follows:

$$BPC = B + X \quad (1)$$

where B is given as follows:

$$B = 2^i \times 16, \text{ where } 1 \leq i \leq 7 \text{ for } F\text{-}PCH \text{ and } 2 \leq i \leq 8 \text{ for } F\text{-}CCCH. \quad (2)$$

and X is a fixed offset. For example in a communication system in accordance with the IS-2000 standard, the values are 3 on the F-PCH and 7 on F-CCCH.

The value of a broadcast index i (BCAST_INDEX) is transmitted by the sector in the Extended System Parameters Message (ESPM) for F-PCH and Multicarrier Radio Resource Parameters Message (MCRR) for F-CCCH.

A subscriber station in a slotted mode monitors a slot, is determined in accordance with the following equation:

$$B = 2^j \times 16, \text{ where } 1 \leq j \leq 7 \text{ for } F\text{-}PCH \text{ and } 2 \leq j \leq 8 \text{ for } F\text{-}CCCH \qquad (3)$$

where the value of a slot index j (BCAST_INDEX) is transmitted by the sector in the Extended System Parameters Message (ESPM) for F-PCH and Multicarrier Radio Resource Parameters Message (MCRR) for F-CCCH.

As a consequence, for any combination of the broadcast index i and a slot index j, there would be a collision between a broadcast slot, which the subscriber station monitors for broadcast in accordance with the Equation (2), and a slot monitored by the subscriber station for individually addressed messages in slotted mode in accordance with the Equation (3). The collision would be repeated in the same slot; consequently, the subscriber station monitoring the particular slot would always encounter a collision between the multicast page and the individual page. Introduction of the offset X into Equation (2) resulting in Equation (1) does not completely eliminate the collision, but prevents the collision to occur in periodically in the same slot, therefore, the collision is spread among all the subscriber stations. Thus, each subscriber station can decode either message in a non-affected slot.

The first slot of each BPC is an F-PCH/F-CCCH slot, for which the following Equation holds:

$$t/4 \bmod (BPC) = t/4 \bmod (B+X) = 0, \qquad (3)$$

where t represents system time expressed in frames; and mod means a modulo arithmetic.

Such an arrangement would require each subscriber station to wake up and monitor not only a slot individually assigned to the mobile for other types of messages, but also every first slot of the BPC of the F-PCH/F-CCCH, thus, increasing power consumption. To avoid such power consumption, slots of a forward quick paging channel (F-QPCH), associated with a F-PCH/F-CCCH, contain Broadcast Indicator (BI) bits that are used to inform subscriber stations monitoring the F-QPCH about occurrence or non-occurrence of the common MPC on the first slot of the BPC of the corresponding F-PCH/F-CCCH. If there is a common MPC on the first slot of the BPC of the F-PCH/F-CCCH, the BI bits of the corresponding F-QPCH slot are turned ON, resulting in subscriber stations starting to monitor the first slot of the BPC on the F-PCH/F-CCCH. Although a subscriber station is required to wake up and monitor the BI bits of the first F-QPCH slot of the BPC, because the duration of the BI is much shorter than the duration of the slot of a F-PCH/F-CCCH, the wake up interval is shorter, therefore, battery consumption is achieved.

A disadvantage of the above-described embodiment is that because the MCP for all multicast calls are sent on the first slot of the BPC on the F-PCH/F-CCCH, the BI bits on the corresponding F-QPCH are set to ON, when the MCP is present. Consequently, each subscriber station monitoring the BI indicator must wake up and monitor the first slot on the F-PCH/F-CCCH to determine, whether the MCP is intended to the subscriber station. Therefore, the subscriber stations not belonging to the multicast group for which the MCP is intended still increase power consumption. As illustrated in FIG. 5, a GPM, containing a common MCP for subscriber stations $MS_1$ and $MS_2$ belonging to a multicast group (GC_1), is transmitted in the first slot of a BPC on the F-PCH/F-CCCH (Slot 0_p). However, because the BI bits in the corresponding slot of the F-QPCH (Slot 0_q) is set ON, all subscriber stations $MS_1$-$MS_4$, must wake up and monitor the Slot 0_p of the F-PCH/F-CCCH. Similarly, a GPM, containing a common MCP for subscriber stations $MS_3$ belonging to a multicast group (GC_2) is transmitted in the first slot of the next BPC of the F-PCH/F-CCCH (Slot 4_p). Therefore, the BI bits in the corresponding slot of the F-QPCH (Slot 4_q) is set ON and all subscriber stations $MS_1$-$MS_4$, must wake up and monitor the Slot 4_p of the F-PCH/F-CCCH, although the GPM contains only a common MCP intended for a subscriber station $MS_3$.

One of ordinary skills in the art recognizes that the above-described embodiment utilized the first slot of the BPC as a concession to an existing standard. Consequently, such a limitation is unnecessary in general, and any slot of the BPC pre-agreed upon by the access network and the subscriber stations can be used. Consequently, in accordance with another embodiment, the limitation that the MPC may be sent in only the first slot of a BPC on the F-PCH/F-CCCH is removed. For terminology consistency reasons, the term BPC is replaced by a term multicast paging cycle (MPCY). One of ordinary skills in the art understands that the concepts of BPC and MPCY are identical. Because it is still desired that a subscriber station does not wake up to monitor every slot of the F-PCH/F-CCCH, it is necessary to establish a procedure, allowing the sector to determine, in which slot to send a message to a particular multicast group, and allowing subscriber station(s) belonging to the multicast group to determine, which slot to monitor. The procedure is defined by a mapping function, e.g., a hash function, accepting input parameters, e.g., the total number of slots in the MPCY, and a GROUP_ID, and outputting a number, which identifies the slot, in which a paging message, containing common MPC for subscriber stations belonging to the multicast group identified by that GROUP_ID, will be transmitted. Alternatively, the mapping can be implemented as a table or any other algorithm mapping the GROUP_ID to a slot number. Because a subscriber station is given a GROUP_ID of each group, to which the subscriber station belong, e.g., upon subscription to the group; the subscriber station may use the hash function to determine the F-QPCH slot to monitor to read the BI indicator. This reduces the probability of false alarm, i.e., the subscriber station waking up for a MCP for a Multicast Group to which the subscriber station does not belong. One of ordinary skills in the art understands that a hash function has been used only as an example, and any other mapping function, allowing both the access network and the subscriber station arrive at the same slot given the same input parameters, is acceptable.

Figure 6:
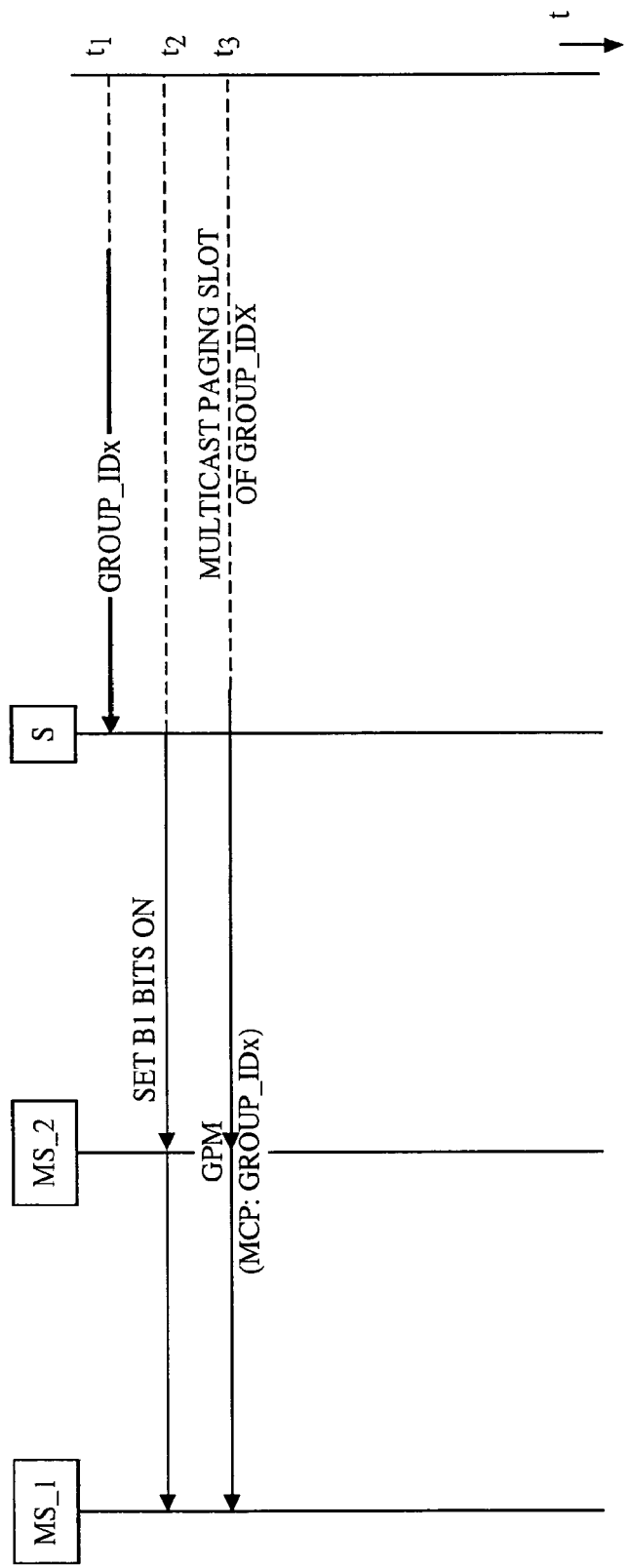
FIG. 6 illustrates a message flow in accordance with another embodiment of notification.
Figure 7:
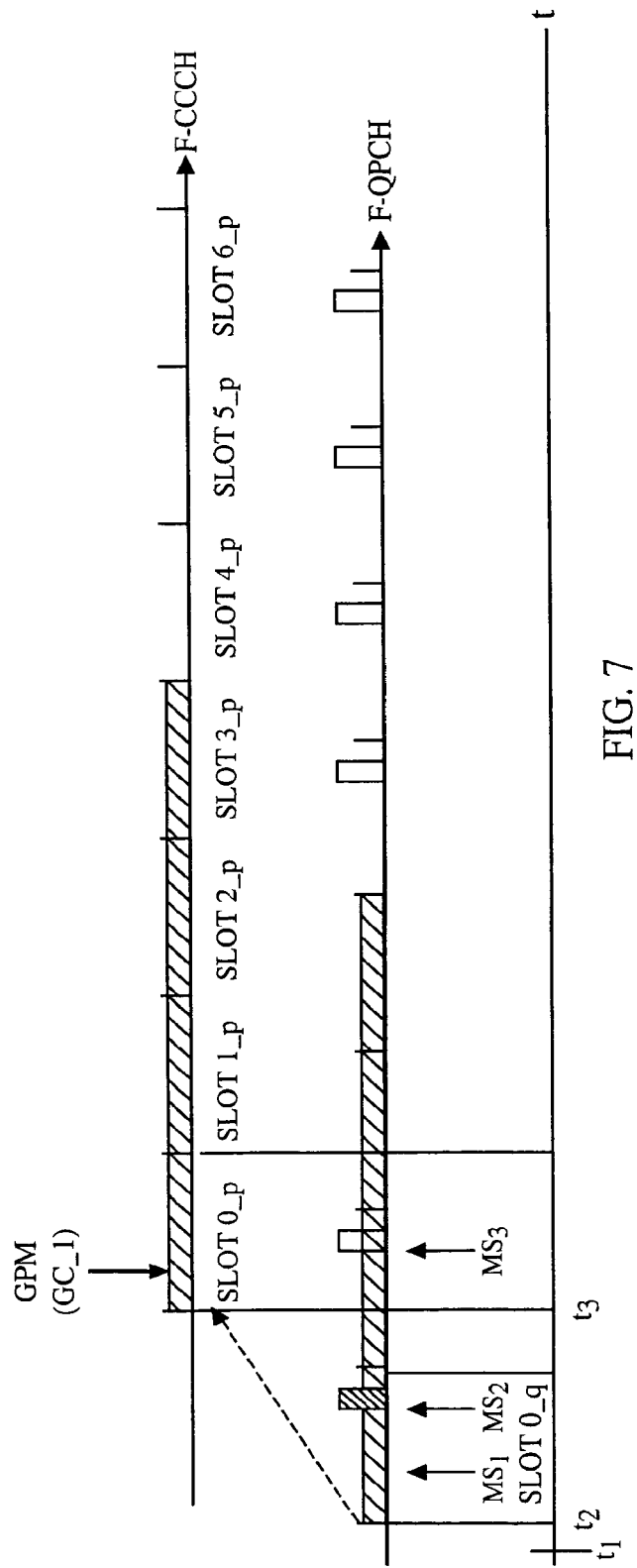
FIG. 7 illustrates a relationship between signaling conveyed over a Forward Quick paging channel and a Forward Common Control Channel or a Forward Paging Channel in accordance with another embodiment.

An example of message flow in accordance with the above-described embodiment is illustrated in FIG. 6. At an instant $t_1$ a sector S receives an indication GROUP_IDx from a source of information (not shown) that a multicast call intended for group with GROUP_IDx, comprising subscriber stations MS_1 and MS_2 is to start. As discussed, such a source of information may comprise e.g., a server, another subscriber station, or another source. The sector S creates the common MCP containing the GROUP_IDx for subscriber stations MS_1 and MS_2, and enters the GROUP_IDx together with the number of slots of the MPCY into a mapping function. Referring to FIG. 7, the hash function returns an indication that the MCP for the GROUP_IDx is to be sent in Slot 0_p. At an instant $t_2$, indicating beginning of slot (Slot 0_q) of F-QPCH corresponding to Slot 0_p of F_CCCH, the sector S sets BI bit to ON. The subscriber stations MS_1 and MS_2, that used the same hashing function to determine which slot of F-QPCH to monitor, detect that the BI bit in the Slot 0_q is set to ON. The subscriber stations MS_1 and MS_2 then wake up for monitoring of Slot 0_p at instant $t_3$. At the instant $t_3$, indicating beginning of Slot 0_p the sector S transmits the MCP as a part of the page message, e.g., the GPM.

As indicated in FIG. 5, MS_3 is a member of a multicast group different from the multicast group indicated by GROUP_IDx. Because no request for multicast call for the multicast group to which MS_3 belong has been received, no notification is needed in Slot 1_p of the F_CCCH, and the BI bits in a slot of F-QPCH corresponding to Slot 1_q of F_CCCH, are set to OFF.

In another embodiment, the subscriber stations are informed about a multicast call over protocol layers higher than an air interface signaling layer. As is known in the art, layering is a method for organizing communication protocols in well-defined encapsulated data units between otherwise de-coupled processing entities, i.e., layers. The protocol layers are implemented in both base stations 110 and remote stations 116. In accordance with the Open Systems Interconnection (OSI) model, protocol layer L1 provides for the transmission and reception of radio signals between the base station and remote station, layer L2 provides for the correct transmission and reception of signaling messages, and layer L3 provides for the control messaging for the communication system. Layer L3 originates and terminates signaling messages according to the semantics and timing of the communication protocol between a base station 110 and a remote station 116. In a cdma2000 system, the air interface signaling layer L1 is referred to as the Physical Layer, L2 is referred to as the Link Access Control (LAC) Layer or the Medium Access Control (MAC) Layer, and L3 is referred to as the Signaling Layer. Above the Signaling Layer are layers, which in accordance with the OSI model are numbered L4-L7 and referred to as Transportation, Session, Presentation and Application Layers.

In accordance with the embodiment, a link layer session is established between the source of information and a subscriber station using an existing communication system interface. Such a link layer protocol can comprise, e.g., a point-to-point protocol (PPP), a Serial Line Internet Protocol (SLIP), or other link layer protocol known to one of ordinary skills in the art may be utilized without departing from the scope of the present invention. Link layer protocols are described in documents known to ordinarily skilled artisans, e.g., IS-707 standard. The multicast call notification message is then sent via Internet protocol (IP) connection of the link layer session.

Figure 8:
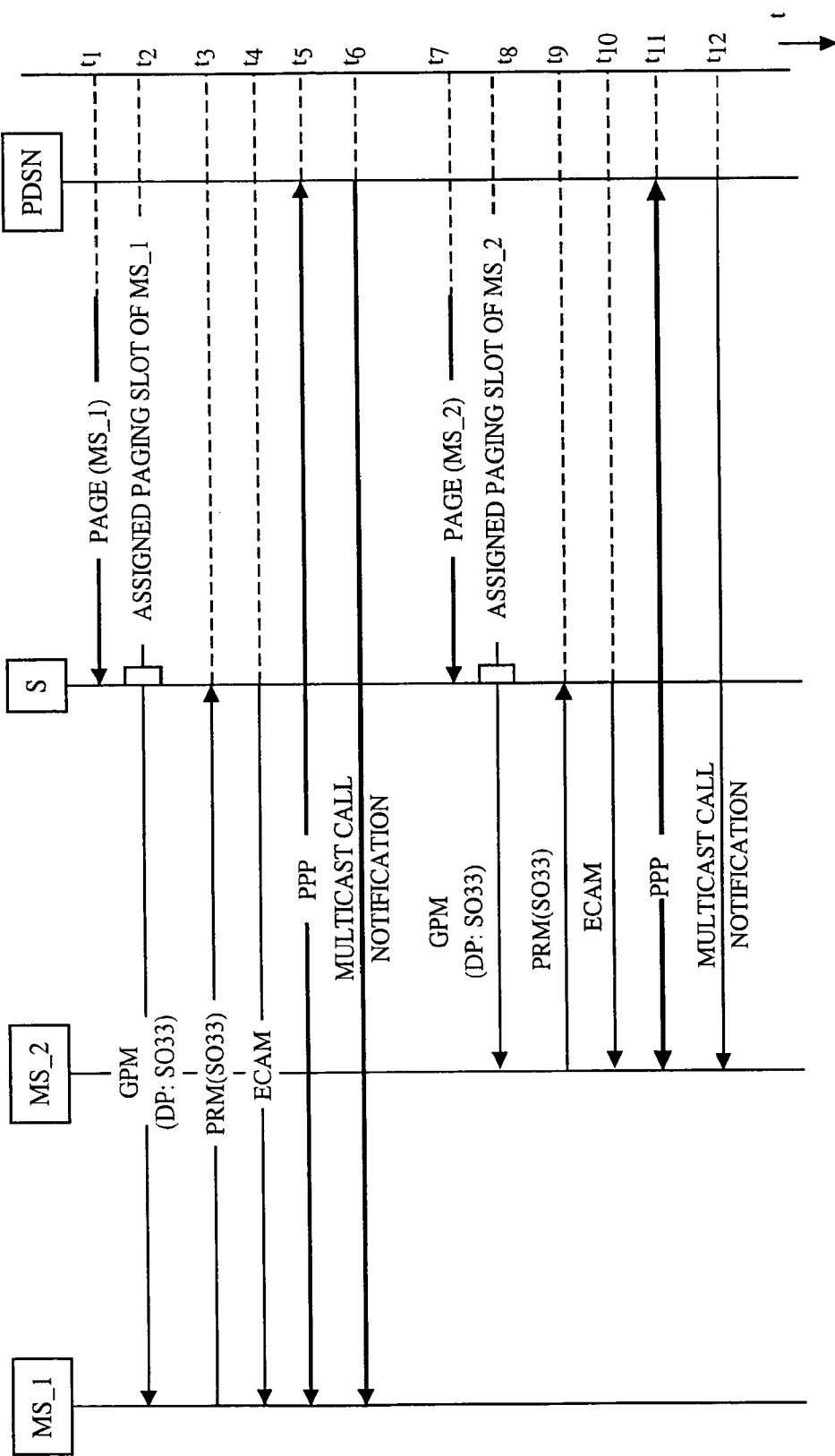
FIG. 8 illustrates a message flow in accordance with another embodiment of notification.

FIG. 8 illustrates an example of message flow in accordance with one embodiment. At an instant $t_1$, a sector S receives an indication Page(MS_1) from a source of information via a Packet Service Data Node (PSDN) that a multicast call intended for group comprising subscriber station MS_1 is to start. The sector S generates a page record intended for the subscriber station MS_1 for a call set-up requesting a PPP (DP). Because the requested call is a point-to-point type of a call, the page record is an individual for each member subscriber station. In accordance with an IS-707, such a service option is SO33. As discussed above, the service option is included in the content part of a page record. The sector S then generates an appropriate page message, e.g., a GPM, and waits until time $t_2$ for the paging slot assigned to the subscriber station MS_1. At time $t_2$, the page message is transmitted as a part of a GPM(DP:SO33) to MS_1. In one embodiment, the subscriber station MS_1 acknowledges receipt of the MCP at time $t_3$. As illustrated in FIG. 8, in a communication system in accordance with the IS-2000 standard, the response comprises page response message (PRM (SO33)), which is modulated on a reverse channel, e.g. an access channel. At time $t_4$, the sector S sends a notification which channel is the multicast call to use. In a communication system in accordance with the IS-2000 standard such a notification is sent in an extended channel assignment message (ECAM). Consequently, an SO33 call is established on the channel assigned by the ECAM. Once the SO33 call is established, the PPP between the source PDSN and the subscriber station MS_1 is established at time $t_5$. The MS_1 is then notified about the multicast call commencement over the PPP. The remaining subscriber stations belonging to the multicast group and interested in the multicast call follow the above described procedure. (Only one additional subscriber station MS_2 is shown for simplicity.) In accordance with another embodiment, upon receiving a notification about a multicast call to a group identified by a GROUP_ID from a source, the sector transmits a multicast addressed page record to all subscriber station in the group, for which the multicast call is intended, requesting establishment of a link layer protocol. As discussed above, the subscriber stations belonging to the group identified by the GROUP_ID are not necessarily assigned the same slot on the paging channel. Consequently, any of the solutions described above to properly deliver the multicast addressed page are applicable.

Once a subscriber station belonging to the group responds to the multicast addressed page by sending a PRM, the sector sets up the link layer protocol, e.g., a SO33 call with the subscriber station as described above, and notifies the subscriber station are about the multicast call commencement over the link layer protocol. The link layer protocol call set up and the notification is then repeated for each remaining subscriber station. Such an individual link layer protocol set up is possible because although the access network did not necessarily know the identities of the individual subscriber station upon sending the multicast addressed page, upon receiving the responses from subscriber stations the identities were revealed.

Response to Notification of Multicast Call Commencement

As discussed above, when a multicast call is to be initiated, the subscriber stations that are members of the multicast group must be notified. Once a subscriber station receives a notification that a multicast call is commencing, there are several alternatives for whether and how the subscriber station responds to the notification.

According to one alternative, the subscriber station is not required to respond even if the subscriber station is interested in participation in the multicast service. Such an alternative is acceptable for example in the case of multicast services, which are of general interest and delivery of which to each subscriber station is not critical, e.g., stock market information updates, streaming video, and other information of similar nature.

According to another alternative, the subscriber station is always required to respond if the subscriber station is interested in participation in the multicast service. The response comprises e.g., a message send on a reverse channel to the access network. An example of such a message in a communication system in accordance with the IS-2000 standard is a Page Response Message transmitted on a reverse access channel (R-ACH), reverse enhanced access channel (R-EACH), and reverse common control channel (R-CCCH). Such a response must contain information useful for the next action taken by the access network. Depending on design features of a communication system, such information may indicate whether the subscriber station is interested in joining the multicast service; whether the subscriber station is not interested in joining the multicast service; whether the subscriber station is interested but cannot participate due to not supporting the required configuration, e.g., a data rate.

The access network waits for response from member subscriber stations before channel assignment. Such an alternative is required for services, requiring the access network to know whether each subscriber station participates. Additionally, the response allows the access network to decide, whether to assign a shared channel or a dedicated channel for the multicast content. When a decision to assign a dedicated channel to each subscriber station is made, the response prevents the access network from assigning a dedicated traffic channel to a non-participating subscriber station.

As explained above, in one embodiment, each subscriber station that is a member of a multicast group is notified about a start of a multicast call intended for the group by a common message addressed to the member subscriber stations. When a subscriber station that is not a member of the group identified in the common message receives a notification, the subscriber station may ignore the notification and not respond. However, if an AdHoc multicast group formation is supported, all the subscriber station receiving the notification may be required to respond. The term AdHoc multicast group is used herein to mean a multicast group that is not predetermined, but is created upon initiation of the multicast call. Whether an AdHoc multicast group formation is supported or not, the requirement of response to the common message notification elicits responses from the subscriber stations that received the notification. Because numerous subscriber stations may respond, a method for staggering the response message, e.g., a Page Response Message from the subscriber stations in the group, may be implemented to avoid a collision from a burst of responses.

According to another alternative, the subscriber station is always required to respond, even if the subscriber station is not interested in participation in the multicast service. Such an alternative is required for services, requiring the access network to know with certainty whether each subscriber station participates. Unlike the previous alternative, the present alternative allows the access network to differentiate with certainty between subscriber stations that do not respond due to no interest in the multicast service, and subscriber stations that do not respond due to failure to receive a notification. Thus, the access network may take appropriate action, e.g., repeat the notification. The remaining consideration as described with regards to the previous alternative are applicable.

It will be understood by one of ordinary skills in the art that the above-described alternatives were treated separately for tutorial purposes only. A communication system will use any alternative appropriate for a multicast service. For example, when a multicast call, delivery of which to each subscriber station is not critical, is to commence, no response may be required from the member subscriber stations. When the same member subscriber stations need to participate in a subsequent multicast call, a response may be required. The indication whether and what response is required by the access network can be indicated to the subscriber stations, e.g., by a signaling contained in the notification message. However, any other means of response indication is contemplated.

Channel Assignment for a Multicast Call Commencement

As alluded to above, the communication system 100 provides the content over a forward link channel 114 to the member subscriber stations. Consequently, the forward link channel, whether shared among the member subscriber stations or established individually between each member subscriber station and a base station, must be assigned by an entity of the communication system 100 before the multicast service may commence.

As described above, there are several methods of notification, several methods of response, and several methods of channel assignments. Consequently, several possible combinations of notification, response, and channel assignments are possible as described in the embodiments below.

As discussed, in one embodiment, the member subscriber stations are notified about the multicast service via a common overhead message or a common page message. Because the multicast service notification is broadcasted in a common message to multiple subscriber station, and not to an individual subscriber station, the entity generating the common message does not need to know the identities of individual member subscriber stations of the multicast group.

If the member subscriber stations are not required to respond, the channel assignment information for the multicast service traffic channel, e.g., channel identification (Walsh Code in case of a communication system in accordance with IS-2000 standard), data rate, and other assignment information known to one of ordinary skills in the art may be included as part of the notification. Consequently, in case of notification via a common overhead message, the channel assignment information would be part of the overhead message; in case of notification via a common page message, the channel assignment information is part of the MCP. Because the channel assignment information is multicasted and no response is required, the type of channel assigned must be a shared channel. Alternatively, the channel assignment information may be conveyed to the subscriber stations separate from the notification.

Once the subscriber station processes the message, the interested subscriber station(s) start to monitor the assigned channel to receive multicast service traffic.

Figure 9:
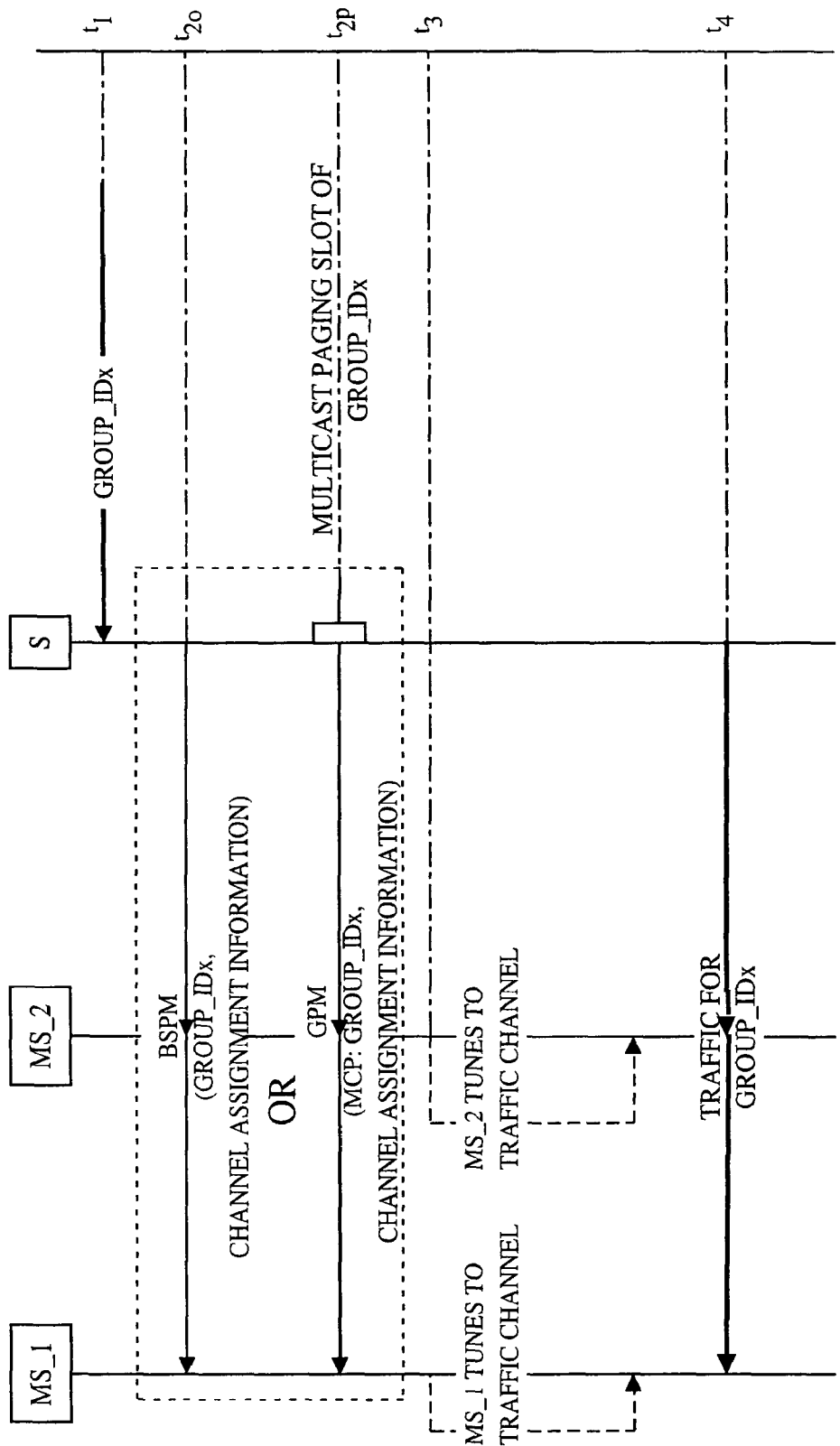
FIG. 9 illustrates a message flow in accordance with another embodiment of response/channel assignment.

An example of message flow in accordance with the above-described embodiment is illustrated in FIG. 9. At an instant $t_1$, a sector S receives an indication GROUP_IDx that a multicast call intended for group with an identifier GROUP_IDx is to start. The indication may be provided by another entity of the communication system, e.g., a base station controller, a PSTN, a source of information (not shown), an other entities. Alternatively, the sector S receives identity of the subscriber stations MS_1 and MS_2. The sector S then determines the identifier of the multicast group GROUP_IDx comprising the subscriber stations MS_1 and MS_2, e.g., by querying a database. As discussed, the source of information may comprise, e.g., a server, another subscriber station, or any other source known to one skilled in the art.

The sector S includes the identifier and the channel assignment information into the overhead message, which in one embodiment comprises a broadcast system parameters message BSPM. The sector S broadcasts the BSPM (GROUP_IDx, Channel Assignment Information) at time $t_{20}$. Subscriber stations MS_1 and MS_2 that are members of the group with the identifier receive the BSPM(GROUP_IDx, Channel Assignment Information), process the BSPM and take an appropriate action at time $t_3$, e.g., tune to and start monitoring the physical channel on which the identified multicast call is being transmitted. At time $t_4$ the content of the multicast service starts to be transmitted on the traffic channel (Traffic for Group_IDx). As discussed, the overhead message BSPM repeats itself periodically, consequently, if the identifier and the channel assignment information is included in each message, likewise, the identifier and the channel assignment information will be transmitted in the next instance(s) of the overhead message BSPM. Only one instance at time $t_{20}$ is shown.

Alternatively, the sector S includes the identifier and the channel assignment information into a page message, e.g. a general page message (GPM). The sector S determines the slot on a paging channel monitored by the member subscriber stations using any of the above-described embodiments. The section then transmits the GPM(MCP:GROUP_IDx, Channel Assignment Information) in the slot at time $t_{2p}$. Subscriber stations MS_1 and MS_2 that are members of the group with the identifier receive the GPM(MCP:GROUP_IDx, Channel Assignment Information), process the GPM and take an appropriate action at time $t_3$, e.g., tune to and start monitoring the physical channel on which the identified multicast call is being transmitted. At time $t_4$ the content of the multicast service starts to be transmitted on the traffic channel (Traffic for Group_IDx).

If the member subscriber stations are required to respond prior to channel assignment, upon receiving the multicast service notification in the common message, the interested subscriber stations send a response. Such a response may comprise e.g., a signaling message (a new type of message, e.g., a Multicast Service Join Message as a response to the common overhead message or a Page Response Message as a response to the common page message), indicating the interested subscriber stations' desire to participate in the multicast service.

Upon receiving the responses, the entity of the access network responsible for the channel assignment may take the number of responses into account in determining the type of channel to assign. In one embodiment, the access network compares the number of responses to a threshold, and assigns the type of channel in accordance with the result of the comparison. If the entity decides to assign a shared channel, the access network sends a common channel assignment message, e.g., a Multicast Channel Assignment Message (MCAM), containing information for the shared multicast service traffic channel. Thus, the MCAM uses a multicast address to assign the shared channel to the interested subscriber stations.

As has been explained above, the subscriber stations belonging to the group identified by the GROUP_ID are not necessarily assigned the same slot on the paging channel. Consequently, a method enabling efficient method for delivering the multicast call initiation information is required.

In one embodiment, upon receiving the notification, the subscriber stations are required to monitor the paging channel in a non-slotted mode; consequently, the MCAM may be sent in any paging channel slot.

In another embodiment, the MCAM is sent on a slot using the same method employed for determining a slot to send a multicast-addressed notification.

In another embodiment, the common overhead message or the common page message indicates the paging channel slot number, which the subscriber stations are required to monitor for the MCAM.

In another embodiment, the MCAM is sent on each of the slots monitored by the subscriber stations.

It will be understood by one of ordinary skills in the art, that the embodiments described were treated separately for tutorial purposes only. A communication system will use an embodiment appropriate for a multicast service. The selection of the embodiment may be specified e.g., in the notification.

Once the subscriber station processes the message, the subscriber station(s) interested start to monitor the assigned channel to receive multicast service traffic.

Figure 10:
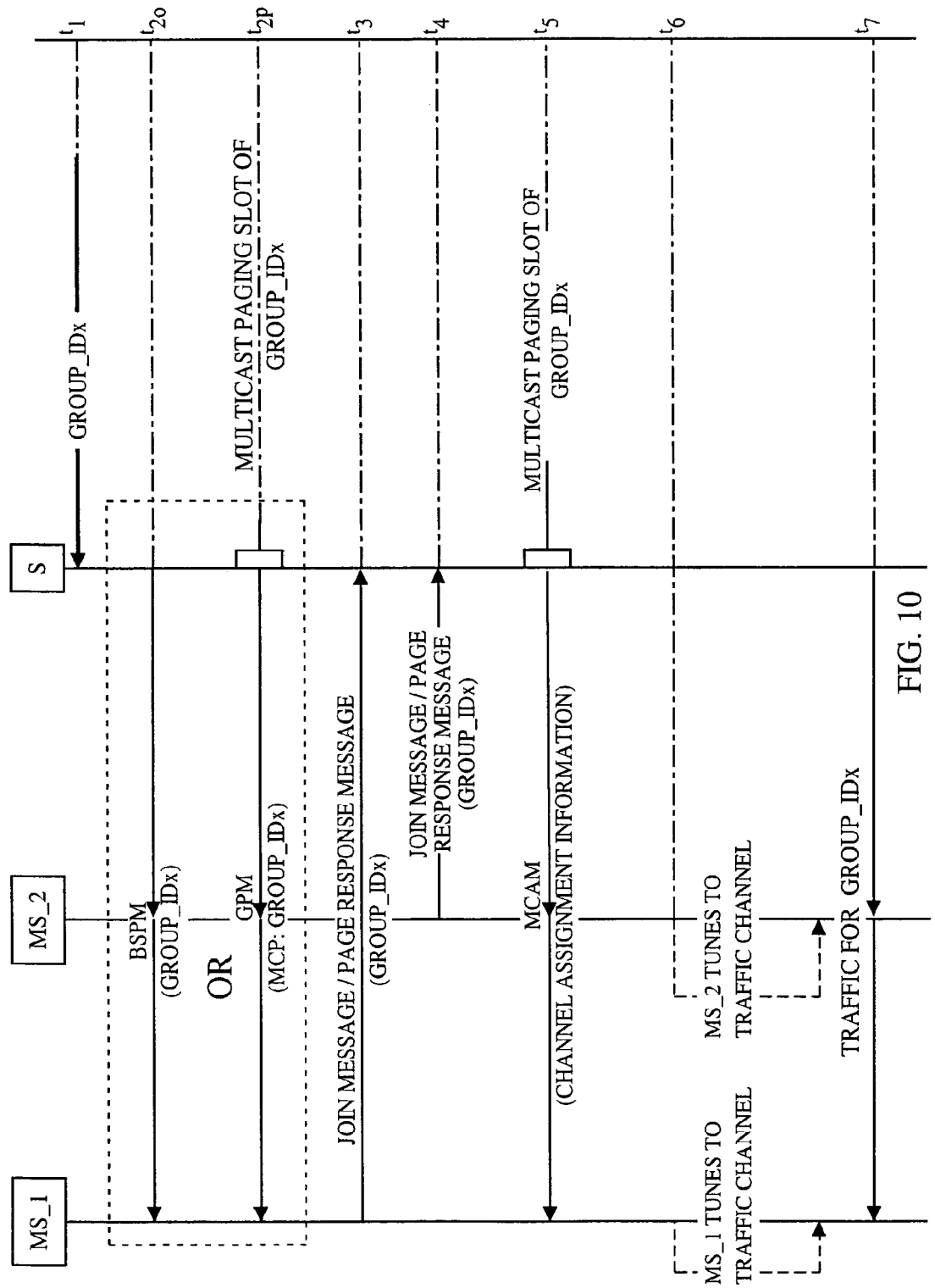
FIG. 10 illustrates a message flow in accordance with another embodiment of response/channel assignment.

An example of message flow in accordance with the above-described embodiment is illustrated in FIG. 10. At an instant $t_1$, a sector S receives an indication GROUP_IDx that a multicast call intended for group with an identifier GROUP_IDx is to start. The indication may be provided by another entity of the communication system, e.g., a base station controller, a PSTN, a source of information (not shown), an other entities. Alternatively, the sector S receives identity of the subscriber stations MS_1 and MS_2. The sector S then determines the identifier of the multicast group GROUP_IDx comprising the subscriber stations MS_1 and MS_2, e.g., by querying a database. As discussed, the source of information may comprise, e.g., a server, another subscriber station, or any other source known to one skilled in the art.

The sector S includes the identifier into the overhead message, which in one embodiment comprises a broadcast system parameters message BSPM. The sector S broadcasts the BSPM(GROUP_IDx) at time $t_{2o}$. Subscriber stations MS_1 and MS_2 that are members of the group with the identifier receive the BSPM(GROUP_IDx), process the BSPM and take an appropriate action, e.g., send a response message. As discussed, the overhead message BSPM repeats itself periodically, consequently, if the identifier is included in each message, the identifier will be transmitted in the next instance (s) of the overhead message BSPM. Only one instance at time $t_{2o}$ is shown.

Alternatively, the sector S includes the identifier into a page message, e.g. a general page message (GPM). The sector S then determines the slot on a paging channel monitored by the member subscriber stations, and transmits the GPM(MCP:GROUP_IDx) in the slot at time $t_{2p}$. Subscriber stations MS_1 and MS_2 that are members of the group with the identifier receive the GPM(MCP:GROUP_IDx), process the GPM and take an appropriate action, e.g., send a response message.

Regardless of what common message was used for notification, the subscriber stations MS_1 and MS_2 send response at time $t_3$, respective $t_4$. Upon receiving the responses, the entity of the access network responsible for the channel assignment determines to assign a shared channel. The sector S determines the method of sending the common channel assignment message, e.g., the MCAM, and sends the MCAM containing information for the shared multicast service traffic channel MCAM(Channel Assignment Information) at time $t_5$. The subscriber stations MS_1 and MS_2 process the MCAM and take an appropriate action, e.g., tune to and start monitoring the physical channel on which the identified multicast call is being transmitted at time $t_6$. At time $t_7$ the content of the multicast service starts to be transmitted on the traffic channel (Traffic for Group_IDx).

In another embodiment, if the entity decides to assign a shared channel, the access network sends an Individual Channel Assignment Message (ICAM), containing information for the shared multicast service traffic channel to each responding member subscriber station. In the context of a communication system in accordance with the IS-2000 standard, the ICAM can comprise, e.g., an Extended Channel Assignment Message.

Such an individual assignment is possible because, although the access network did not necessarily know the identities of the individual subscriber station when sending the notification, upon receiving the responses from subscriber stations the identities were revealed.

It is noted that because the shared multicast service traffic channel is assigned individually as in a point-to-point call, any method known for a point-to-point traffic channel assignment can be used. Consequently, the issue of when to send the ICAM for each subscriber station is not present because the access network knows when each of the interested subscriber stations will be monitoring the paging channel.

Figure 11:
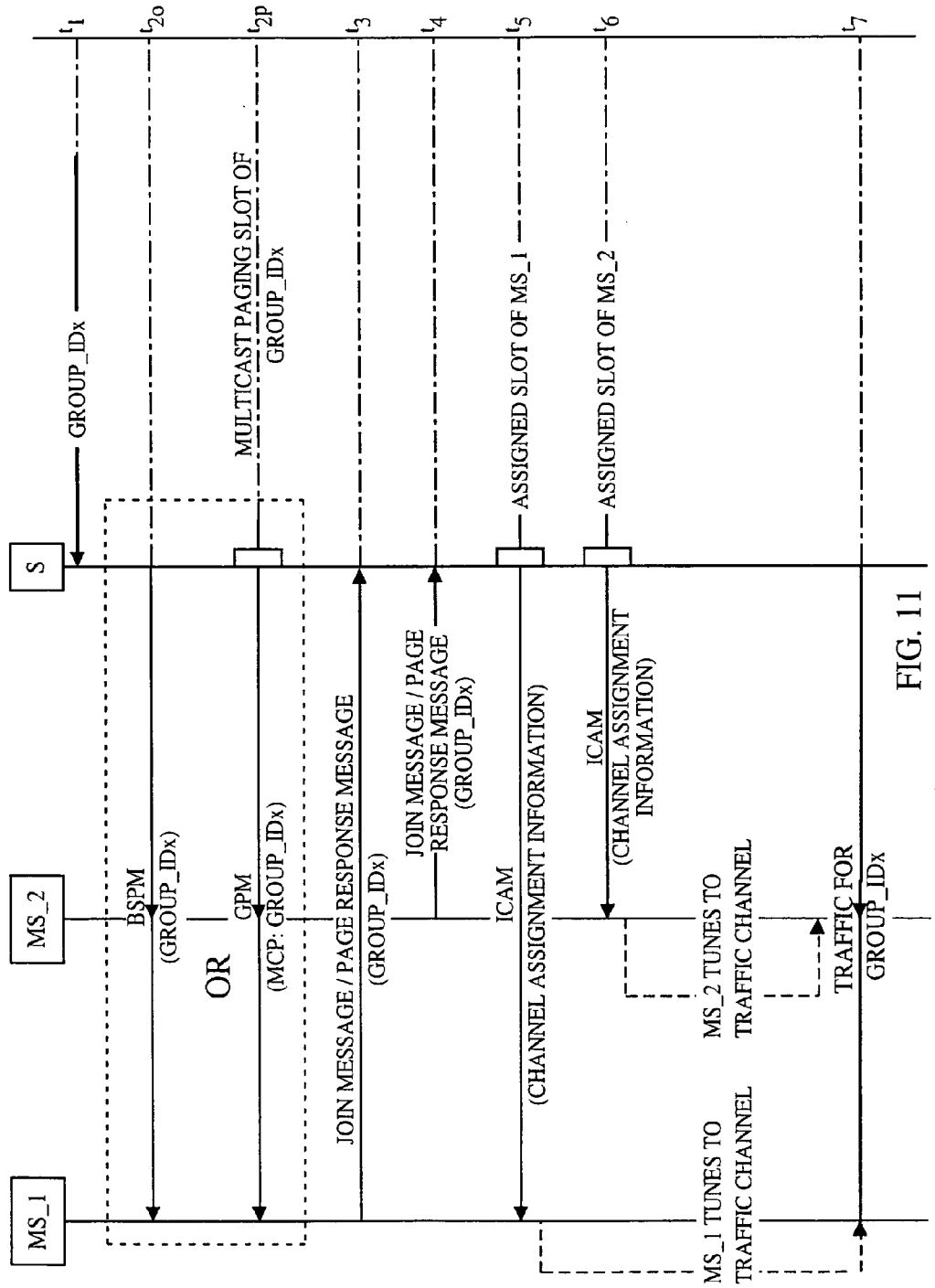
FIG. 11 illustrates a message flow in accordance with another embodiment of response/channel assignment.

An example of message flow in accordance with the above-described embodiment is illustrated in FIG. 11. At an instant $t_1$, a sector S receives an indication GROUP_IDx that a multicast call intended for group with an identifier GROUP_IDx is to start. The indication may be provided by another entity of the communication system, e.g., a base station controller, a PSTN, a source of information (not shown), an other entities. Alternatively, the sector S receives identity of the subscriber stations MS_1 and MS_2. The sector S then determines the identifier of the multicast group GROUP_IDx comprising the subscriber stations MS_1 and MS_2, e.g., by querying a database. As discussed, the source of information may comprise, e.g., a server, another subscriber station, or any other source known to one skilled in the art.

The sector S includes the identifier into the overhead message, which in one embodiment comprises a broadcast system parameters message BSPM. The sector S broadcasts the BSPM(GROUP_IDx) at time $t_{2o}$. Subscriber stations MS_1 and MS_2 that are members of the group with the identifier receive the BSPM(GROUP_IDx), process the BSPM and take an appropriate action, e.g., send a response message. As discussed, the overhead message BSPM repeats itself periodically, consequently, if the identifier is included in each message, the identifier will be transmitted in the next instance(s) of the overhead message BSPM. Only one instance at time $t_{2o}$ is shown.

Alternatively, the sector S includes the identifier into a page message, e.g. a general page message (GPM). The sector S then determines the slot on a paging channel monitored by the member subscriber stations, and transmits the GPM(MCP:GROUP_IDx) in the slot at time $t_{2p}$. Subscriber stations MS_1 and MS_2 that are members of the group with the identifier receive the GPM(MCP:GROUP_IDx), process the GPM and take an appropriate action, e.g., send a response message.

Regardless of what common message was used for notification, the subscriber stations MS_1 and MS_2 send response at time $t_3$, respective $t_4$. Upon receiving the responses, the entity of the access network responsible for the channel assignment determines to assign dedicated channels. Because the sector S knows the identity of the subscriber stations MS_1 and MS_2 from the responses received, the sector S determines the slot in which the subscriber stations MS_1 and MS_2 will be monitoring the paging channel in accordance with the response. The sector S waits until time $t_5$ for the paging slot monitored by the subscriber station MS_1, and then conveys the individual ICAM(Channel Assignment Information) to the subscriber station MS_1. Similarly, the sector S waits until time $t_6$ for the paging slot monitored by the subscriber station MS_2, and then conveys the individual ICAM(Channel Assignment Information) subscriber station MS_2. The subscriber stations MS_1 and MS_2 process the ICAM and take an appropriate action, e.g., tune to and start monitoring the physical channel on which the identified multicast call is being transmitted at time $t_5$ respective $t_6$. At time $t_7$ the content of the multicast service starts to be transmitted on the traffic channel (Traffic for Group_IDx).

In another embodiment, if the entity decides to assign a dedicated channel for each responding member subscriber station, the access network sends an individual channel assignment message, containing information for the dedicated multicast service traffic channels to each responding member subscriber station.

Such an individual assignment is possible because although the access network did not necessarily know the identities of the individual subscriber station when sending the notification, upon receiving the responses from subscriber stations the identities were revealed.

Because the multicast service traffic channel is assigned individually as in a point-to-point call, any method known for a point-to-point traffic channel assignment can be used. Specifically, the access network knows when each of the interested subscriber stations will be monitoring the paging channel.

Figure 12:
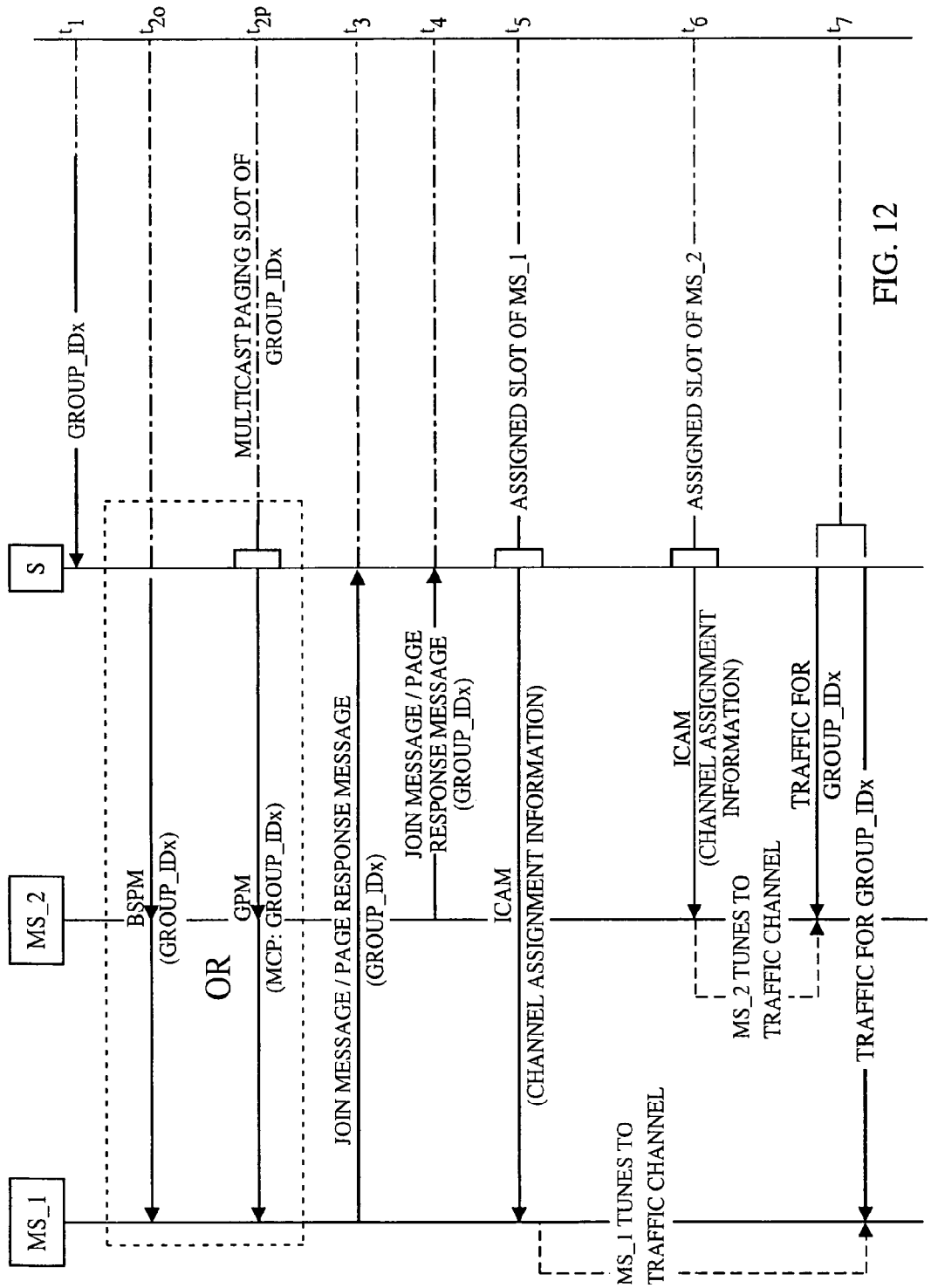
FIG. 12 illustrates a message flow in accordance with another embodiment of response/channel assignment.
Figure 13:
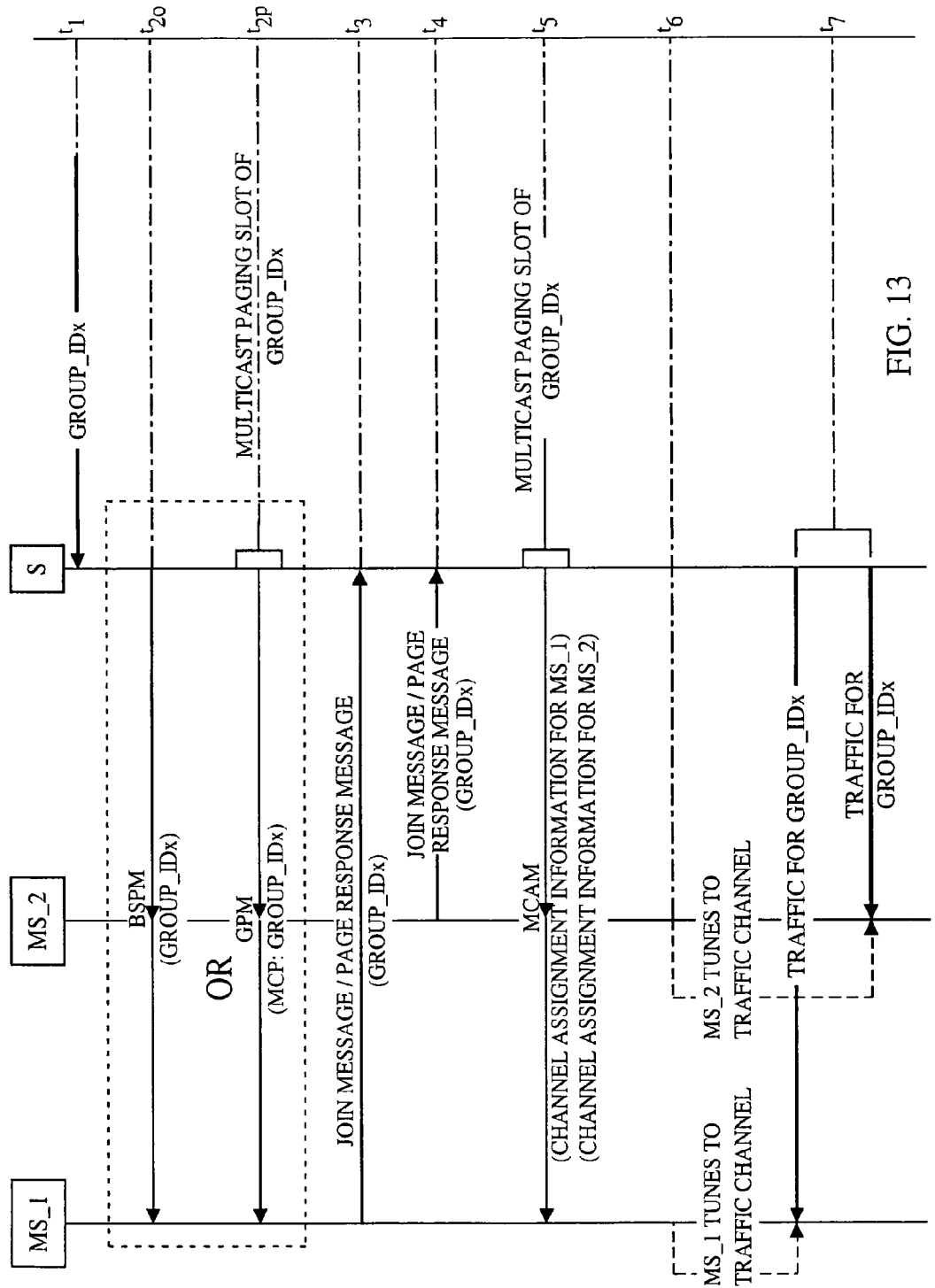
FIG. 13 illustrates a message flow in accordance with another embodiment of response/channel assignment.

An example of message flow in accordance with the above-described embodiment is illustrated in FIG. 12. At an instant $t_1$, a sector S receives an indication GROUP_IDx that a multicast call intended for group with an identifier GROUP_IDx is to start. The indication may be provided by another entity of the communication system, e.g., a base station controller, a PSTN, a source of information (not shown), an other entities. Alternatively, the sector S receives identity of the subscriber stations MS_1 and MS_2. The sector S then determines the identifier of the multicast group GROUP_IDx comprising the subscriber stations MS_1 and MS_2, e.g., by querying a database. As discussed, the source of information may comprise, e.g., a server, another subscriber station, or any other source known to one skilled in the art.

The sector S includes the identifier into the overhead message, which in one embodiment comprises a broadcast system parameters message BSPM. The sector S broadcasts the BSPM(GROUP_IDx) at time $t_{2o}$. Subscriber stations MS_1 and MS_2 that are members of the group with the identifier receive the BSPM(GROUP_IDx), process the BSPM and take an appropriate action, e.g., send a response message. As discussed, the overhead message BSPM repeats itself periodically, consequently, if the identifier is included in each message, the identifier will be transmitted in the next instance(s) of the overhead message BSPM. Only one instance at time $t_{2o}$ is shown.

Alternatively, the sector S includes the identifier into a page message, e.g. a general page message (GPM). The sector S then determines the slot on a paging channel monitored by the member subscriber stations, and transmits the GPM(MCP:GROUP_IDx) in the slot at time $t_{2p}$. Subscriber stations MS_1 and MS_2 that are members of the group with the identifier receive the GPM(MCP:GROUP_IDx), process the GPM and take an appropriate action, e.g., send a response message.

Regardless of what common message was used for notification, the subscriber stations MS_1 and MS_2 send response at time $t_3$, respective $t_4$. Upon receiving the responses, the entity of the access network responsible for the channel assignment determines to assign dedicated channels. Because the sector S knows the identity of the subscriber stations MS_1 and MS_2 from the responses received, the sector S determines the slot in which the subscriber stations MS_1 and MS_2 will be monitoring the paging channel in accordance with the response.

The sector S waits until time $t_5$ for the paging slot monitored by the subscriber station MS_1, and then conveys the individual ICAM(Channel Assignment Information) to the subscriber station MS_1. The subscriber station MS_1 processes the ICAM and take an appropriate action, e.g., tunes to and starts monitoring the physical channel on which the identified multicast call is being transmitted at time $t_5$.

Similarly, the sector S waits until time $t_7$ for the paging slot monitored by the subscriber station MS_2, and then conveys the individual ICAM(Channel Assignment Information) subscriber station MS_2. The subscriber station MS_2 processes the ICAM and takes an appropriate action, e.g., tunes to and starts monitoring the physical channel on which the identified multicast call is being transmitted at time $t_6$.

At time $t_7$ the content of the multicast service starts to be transmitted on the dedicated traffic channels (Traffic for Group_IDx).

In another embodiment, if the entity decides to assign a dedicated channel for each responding member subscriber station, the access network sends a common channel assignment message, Multicast Channel Assignment Message (MCAM), containing information for each of the individual multicast service traffic channel. Thus, one MCAM utilizing a multicast address assigns for each interested subscriber stations a dedicated multicast service traffic channel.

As has been explained above, the subscriber stations belonging to the group identified by the GROUP_ID are not necessarily assigned the same slot on the paging channel. Consequently, a method enabling efficient method for delivering the multicast call initiation information is required.

In one embodiment, upon receiving the notification, the subscriber stations are required to monitor the paging channel in a non-slotted mode; consequently, the MCAM may be sent in any paging channel slot.

In another embodiment, the MCAM is sent on a slot using the same method employed for determining a slot to send a multicast-addressed notification.

In another embodiment, the common overhead message or the common page message indicates the paging channel slot number, which the subscriber stations are required to monitor for the MCAM.

In another embodiment, the MCAM is sent on each of the slots monitored by the subscriber stations.

It will be understood by one of ordinary skills in the art, that the embodiments described were treated separately for tutorial purposes only. A communication system will use an embodiment appropriate for a multicast service. The selection of the embodiment may be specified e.g., in the notification.

Once the subscriber station processes the message, the subscriber station(s) interested start to monitor the assigned channel to receive multicast service traffic.

An example of message flow in accordance with the above-described embodiment is illustrated in FIG. 11. At an instant $t_1$, a sector S receives an indication GROUP_IDx that a multicast call intended for group with an identifier GROUP_IDx is to start. The indication may be provided by another entity of the communication system, e.g., a base station controller, a PSTN, a source of information (not shown), an other entities. Alternatively, the sector S receives identity of the subscriber stations MS_1 and MS_2. The sector S then determines the identifier of the multicast group GROUP_IDx comprising the subscriber stations MS_1 and MS_2, e.g., by querying a database. As discussed, the source of information may comprise, e.g., a server, another subscriber station, or any other source known to one skilled in the art.

The sector S includes the identifier into the overhead message, which in one embodiment comprises a broadcast system parameters message BSPM. The sector S broadcasts the BSPM(GROUP_IDx) at time $t_{2o}$. Subscriber stations MS_1 and MS_2 that are members of the group with the identifier receive the BSPM(GROUP_IDx), process the BSPM and take an appropriate action, e.g., send a response message. As discussed, the overhead message BSPM repeats itself periodically, consequently, if the identifier is included in each message, the identifier will be transmitted in the next instance(s) of the overhead message BSPM. Only one instance at time $t_{2o}$ is shown.

Alternatively, the sector S includes the identifier into a page message, e.g. a general page message (GPM). The sector S then determines the slot on a paging channel monitored by the member subscriber stations, and transmits the GPM(MCP: GROUP_IDx) in the slot at time $t_{2p}$. Subscriber stations MS_1 and MS_2 that are members of the group with the identifier receive the GPM(MCP:GROUP_IDx), process the GPM and take an appropriate action, e.g., send a response message.

Regardless of what common message was used for notification, the subscriber stations MS_1 and MS_2 send response at time $t_3$, respective $t_4$. Upon receiving the responses, the entity of the access network responsible for the channel assignment determines to assign a dedicated channel. The sector S determines the method of sending the common channel assignment message, e.g., the MCAM, and sends the MCAM containing information for the dedicated multicast service traffic channel MCAM(Channel Assignment Information) at time $t_5$.

The subscriber station MS_1 processes the MCAM and take an appropriate action, e.g., tunes to and starts monitoring the physical channel on which the identified multicast call is being transmitted at time $t_6$.

Similarly, the subscriber station MS_2 processes the ICAM and takes an appropriate action, e.g., tunes to and starts monitoring the physical channel on which the identified multicast call is being transmitted at time $t_6$.

At time $t_7$ the content of the multicast service starts to be transmitted on the dedicated traffic channels (Traffic for Group_IDx).

In one embodiment, each member subscriber station is notified about the multicast service via an individual page message. Because the multicast service notification is transmitted via a multiple of individual page messages to multiple subscriber stations, the entity generating the individual page messages needs to know the identities of individual member subscriber stations.

If the member subscriber stations are not required to respond, the channel assignment information for the multicast service traffic channel, e.g., channel identification (Walsh Code in case of a communication system in accordance with IS-2000 standard), data rate, and other assignment information known to one of ordinary skills in the art may be included as part of the notification. Consequently, in case of notification via the individual page message, the channel assignment information would be part of the individual page message. Because the channel assignment information is provided in the individual page message, the type of channel assigned may be both a shared channel and a dedicated channel.

Because the member subscriber stations are not required to respond to the multicast service notification, in case that the entity generating the individual page messages decides to assign a dedicated channel to each member subscriber station, the entity may be allocating dedicated resources for member subscriber station that may not be interested in participating in the multicast service. Therefore, it is desirable to determine, whether a member subscriber station that was assigned a dedicated channel is or is not interested in participating in the multicast service, so that the dedicated channel for the non-participating member subscriber station may be reclaimed, and reused for other service, e.g., a regular point-to-point call. In one embodiment, the access network, after the dedicated channels has been assigned and the multicast service has commenced, determines whether the member subscriber stations are active on the assigned reverse link channel.

Once the subscriber station processes the message, the subscriber station(s) interested start to monitor the assigned channel to receive multicast service traffic.

Figure 14:
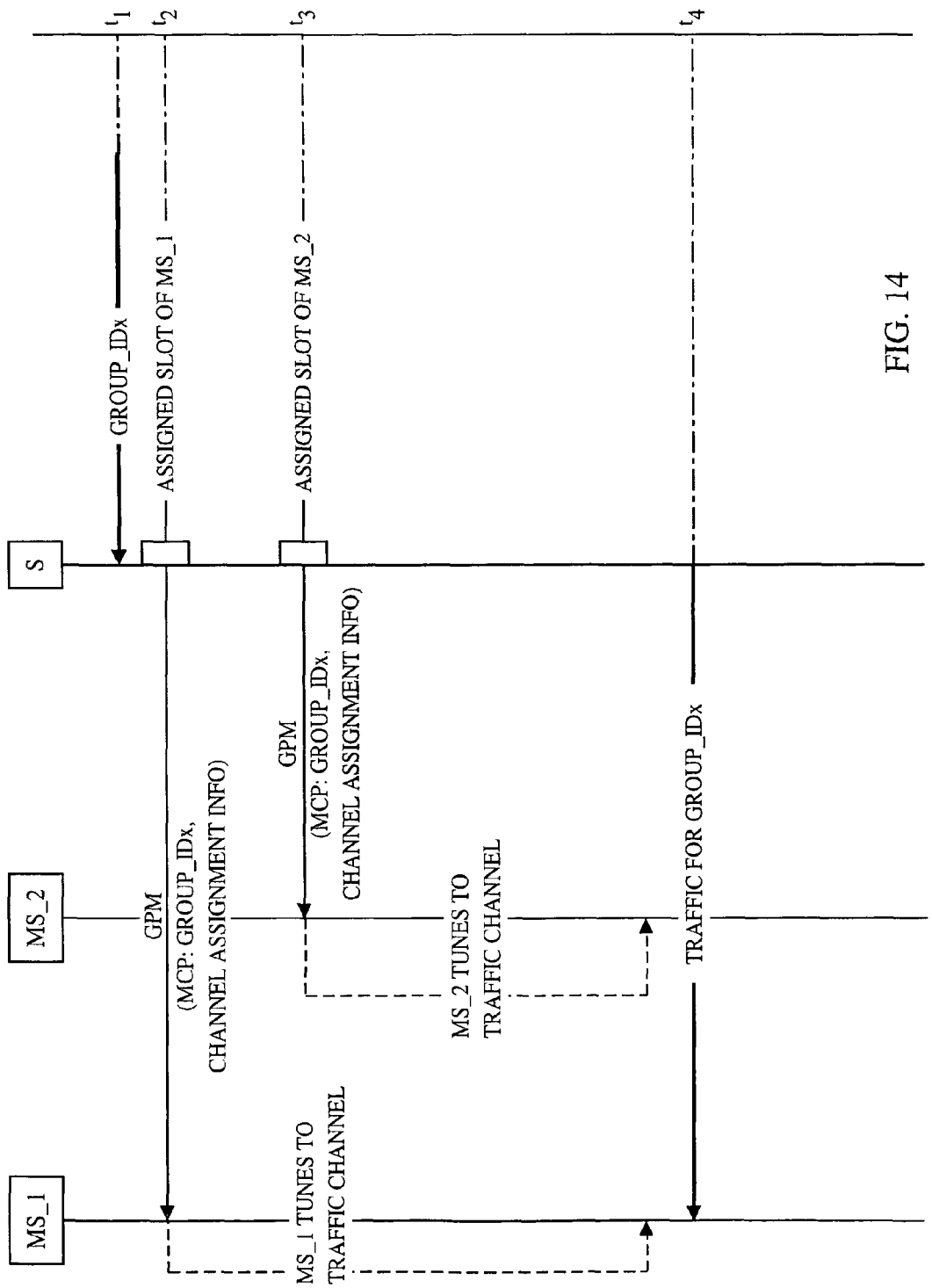
FIG. 14 illustrates a message flow in accordance with another embodiment of response/channel assignment.

An example of message flow in accordance with the above-described embodiment, in which a shared channel is assigned, is illustrated in FIG. 14. At an instant $t_1$, a sector S receives an identity of the subscriber stations MS_1 and MS_2 GROUP_IDx, comprising a group with an identifier GROUP_IDx, for which a multicast call is to start. Alternatively, the sector S receives a group identifier GROUP_IDx. The information may be provided by another entity of the communication system, e.g., a base station controller, a PSTN, a source of information (not shown), an other entities. The sector S then determines the identity of the subscriber stations MS_1 and MS_2, e.g., by querying a database. The sector S then creates an individual MCP containing the identifier GROUP_IDx and a channel assignment information for each subscriber station MS_1 and MS_2, and includes the MCP into a page message, e.g. a general page message (GPM).

The sector S then determines the slots on a paging channel monitored by the member subscriber stations MS_1 and MS_2. At time $t_2$, in a slot monitored by the member subscriber stations MS_1, the sector S transmits the GPM(MCP: GROUP_IDx, Channel Assignment Info). Subscriber station MS_1 receives the GPM(MCP:GROUP_IDx, Channel Assignment Info), processes the GPM and takes an appropriate action, e.g., tunes to and starts monitoring the physical channel on which the identified multicast call is being transmitted.

At time $t_2$, in a slot monitored by the member subscriber stations MS_2, the sector S transmits the GPM(MCP: GROUP_IDx, Channel Assignment Info). Subscriber station MS_2 receives the GPM(MCP:GROUP_IDx, Channel Assignment Info), processes the GPM and take an appropriate action, e.g., tunes to and starts monitoring the physical channel on which the identified multicast call is being transmitted.

At time $t_4$ the content of the multicast service starts to be transmitted on the shared traffic channel (Traffic for Group_IDx).

Figure 15:
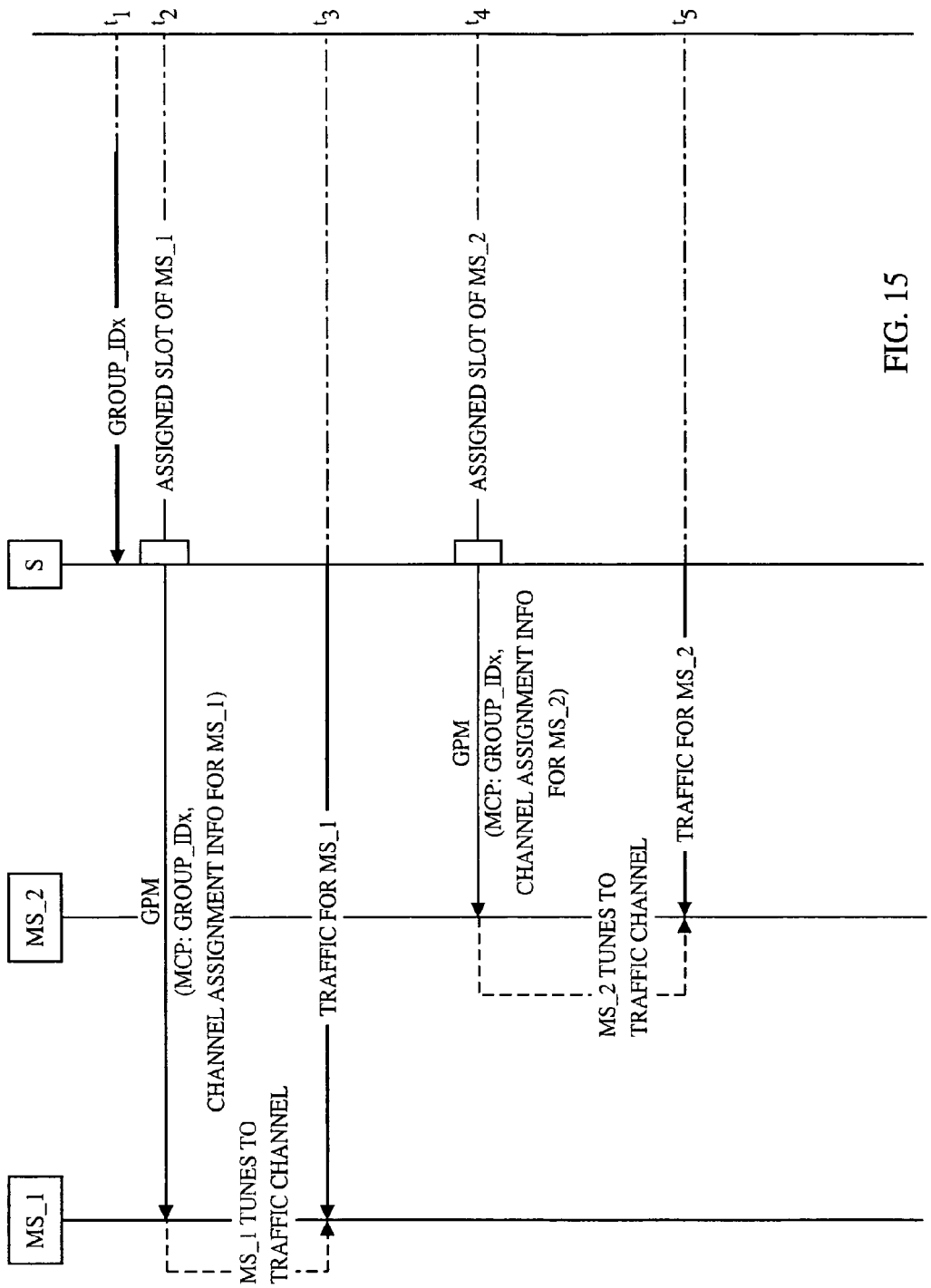
FIG. 15 illustrates a message flow in accordance with another embodiment of response/channel assignment.

An example of message flow in accordance with the above-described embodiment, in which dedicated channels are assigned, is illustrated in FIG. 15. At an instant $t_1$, a sector S receives an identity of the subscriber stations MS_1 and MS_2 GROUP ID_x comprising a group with an identifier GROUP_IDx, for which a multicast call is to start. Alternatively, the sector S receives a group identifier GROUP_IDx. The information may be provided by another entity of the communication system, e.g., a base station controller, a PSTN, a source of information (not shown), an other entities. The sector S then determines the identity of the subscriber stations MS_1 and MS_2, e.g., by querying a database. The sector S then creates an individual MCP containing the identifier GROUP_IDx and a channel assignment information for each subscriber station MS_1 and MS_2, and includes the MCP into a page message, e.g. a general page message (GPM).

The sector S then determines the slots on a paging channel monitored by the member subscriber stations MS_1 and MS_2. At time $t_2$, in a slot monitored by the member subscriber stations MS_1, the sector S transmits the GPM(MCP: GROUP_IDx, Channel Assignment Info for MS_1). Subscriber station MS_1 receives the GPM(GROUP_IDx, Channel Assignment Info for MS_1), processes the GPM and takes an appropriate action, e.g., tunes to and starts monitoring the physical channel on which the identified multicast call for the subscriber station MS_1 is being transmitted (Traffic for MS_1) at time $t_3$.

At time $t_4$, in a slot monitored by the member subscriber stations MS_2, the sector S transmits the GPM(MCP: GROUP_IDx, Channel Assignment Info for MS_2). Subscriber station MS_2 receives the GPM(GROUP_IDx, Channel Assignment Info for MS_2), processes the GPM and take an appropriate action, e.g., tunes to and starts monitoring the physical channel on which the identified multicast call for the subscriber station MS_2 is being transmitted (Traffic for MS_2) at time $t_3$.

If the member subscriber stations are required to respond prior to channel assignment, upon receiving the multicast service notification in the individual page messages, the interested subscriber stations sent a response, e.g., a signaling message like a Page Response Message, indicating the interested subscriber stations' desire to participate in the multicast service.

Upon receiving the responses, the entity of the access network responsible for the channel assignment may take the number of responses into account in determining the type of channel to assign. In one embodiment, the access network compares the number of responses to a threshold, and assigns the type of channel in accordance with the result of the comparison. If the entity decides to assign a shared channel, the access network sends a common channel assignment message, e.g., a Multicast Channel Assignment Message (MCAM), containing information for the shared multicast service traffic channel. Thus, the MCAM uses a multicast address to assign the shared channel to the interested subscriber stations.

As has been explained above, the subscriber stations belonging to the group identified by the GROUP_ID are not necessarily assigned the same slot on the paging channel. Consequently, a method enabling efficient method for delivering the multicast call initiation information is required.

In one embodiment, upon receiving the notification, the subscriber stations are required to monitor the paging channel in a non-slotted mode; consequently, the MCAM may be sent in any paging channel slot.

In another embodiment, the MCAM is sent on a slot using the same method employed for determining a slot to send a multicast-addressed notification.

In another embodiment, the common overhead message or the common page message indicates the paging channel slot number, which the subscriber stations are required to monitor for the MCAM.

In another embodiment, the MCAM is sent on each of the slots monitored by the subscriber stations.

It will be understood by one of ordinary skills in the art, that the embodiments described were treated separately for tutorial purposes only. A communication system will use an embodiment appropriate for a multicast service. The selection of the embodiment may be specified e.g., in the notification.

Once the subscriber station processes the message, the subscriber station(s) interested start to monitor the assigned channel to receive multicast service traffic.

Figure 16:
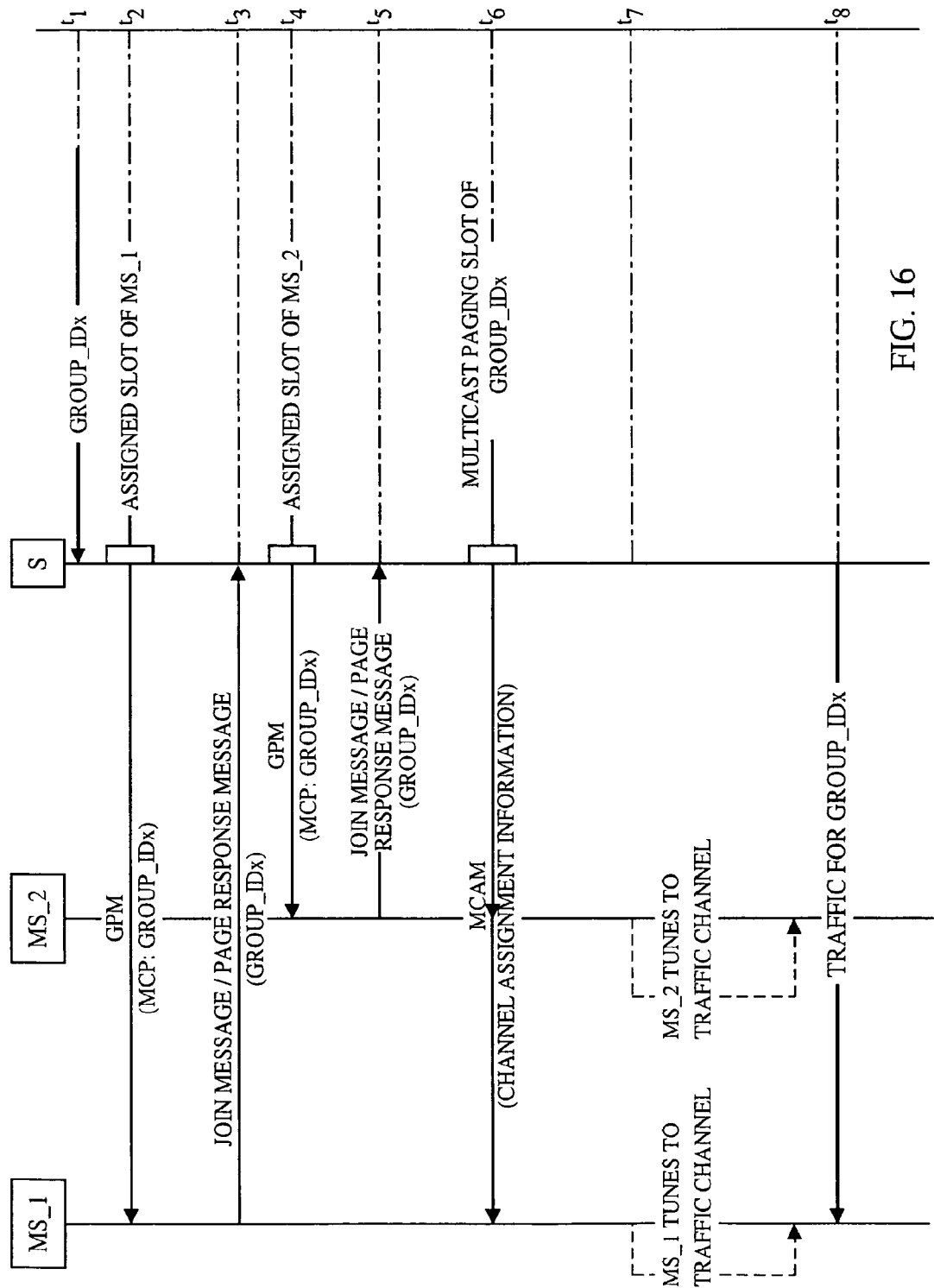
FIG. 16 illustrates a message flow in accordance with another embodiment of response/channel assignment.

An example of message flow in accordance with the above-described embodiment is illustrated in FIG. 16. At an instant $t_1$, a sector S receives an identity of the subscriber stations MS_1 and MS_2 GROUP_IDx, comprising a group with an identifier GROUP_IDx, for which a multicast call is to start. Alternatively, the sector S receives a group identifier GROUP_IDx. The information may be provided by another entity of the communication system, e.g., a base station controller, a PSTN, a source of information (not shown), an other entities. The sector S then determines the identity of the subscriber stations MS_1 and MS_2, e.g., by querying a database. The sector S then creates an individual MCP containing the identifier GROUP_IDx for each subscriber station MS_1 and MS_2, and includes the MCP into a page message, e.g. a general page message (GPM).

The sector S then determines the slots on a paging channel monitored by the member subscriber stations MS_1 and MS_2. At time $t_2$, in a slot monitored by the member subscriber stations MS_1, the sector S transmits the GPM(MCP: GROUP_IDx). Subscriber station MS_1 receives the GPM (GROUP_IDx), and sends a response at time $t_3$.

At time $t_4$, in a slot monitored by the member subscriber stations MS_2, the sector S transmits the GPM(MCP: GROUP_IDx). Subscriber station MS_2 receives the GPM (GROUP_IDx) and sends a response at time $t_5$.

Upon receiving the responses, the entity of the access network responsible for the channel assignment determines to assign shared channel. The sector S waits until time $t_6$ for the paging slot monitored by the subscriber station MS_1, and then conveys the individual ICAM(Channel Assignment Information) to the subscriber station MS_1. The subscriber station MS_1 processes the ICAM and takes an appropriate action, e.g., tunes to and starts monitoring the physical channel on which the identified multicast call is being transmitted.

Similarly, the sector S waits until time $t_7$ for the paging slot monitored by the subscriber station MS_2, and then conveys the individual ICAM(Channel Assignment Information) subscriber station MS_2. The subscriber station MS_2 processes the ICAM and takes an appropriate action, e.g., tunes to and starts monitoring the physical channel on which the identified multicast call is being transmitted.

At time $t_8$ the content of the multicast service starts to be transmitted on the traffic channel (Traffic for Group_IDx).

In another embodiment, if the entity decides to assign a shared channel, the access network sends an Individual Channel Assignment Message (ICAM), containing information for the shared multicast service traffic channel to each responding member subscriber station. In the context of a communication system in accordance with the IS-2000 standard, the ICAM can comprise, e.g., an Extended Channel Assignment Message.

Such an individual assignment is possible because, although the access network did not necessarily know the identities of the individual subscriber station when sending the notification, upon receiving the responses from subscriber stations the identities were revealed.

It is noted that because the shared multicast service traffic channel is assigned individually as in a point-to-point call, any method known for a point-to-point traffic channel assignment can be used. Consequently, the issue of when to send the ICAM for each subscriber station is not present because the access network knows when each of the interested subscriber stations will be monitoring the paging channel.

Figure 17:
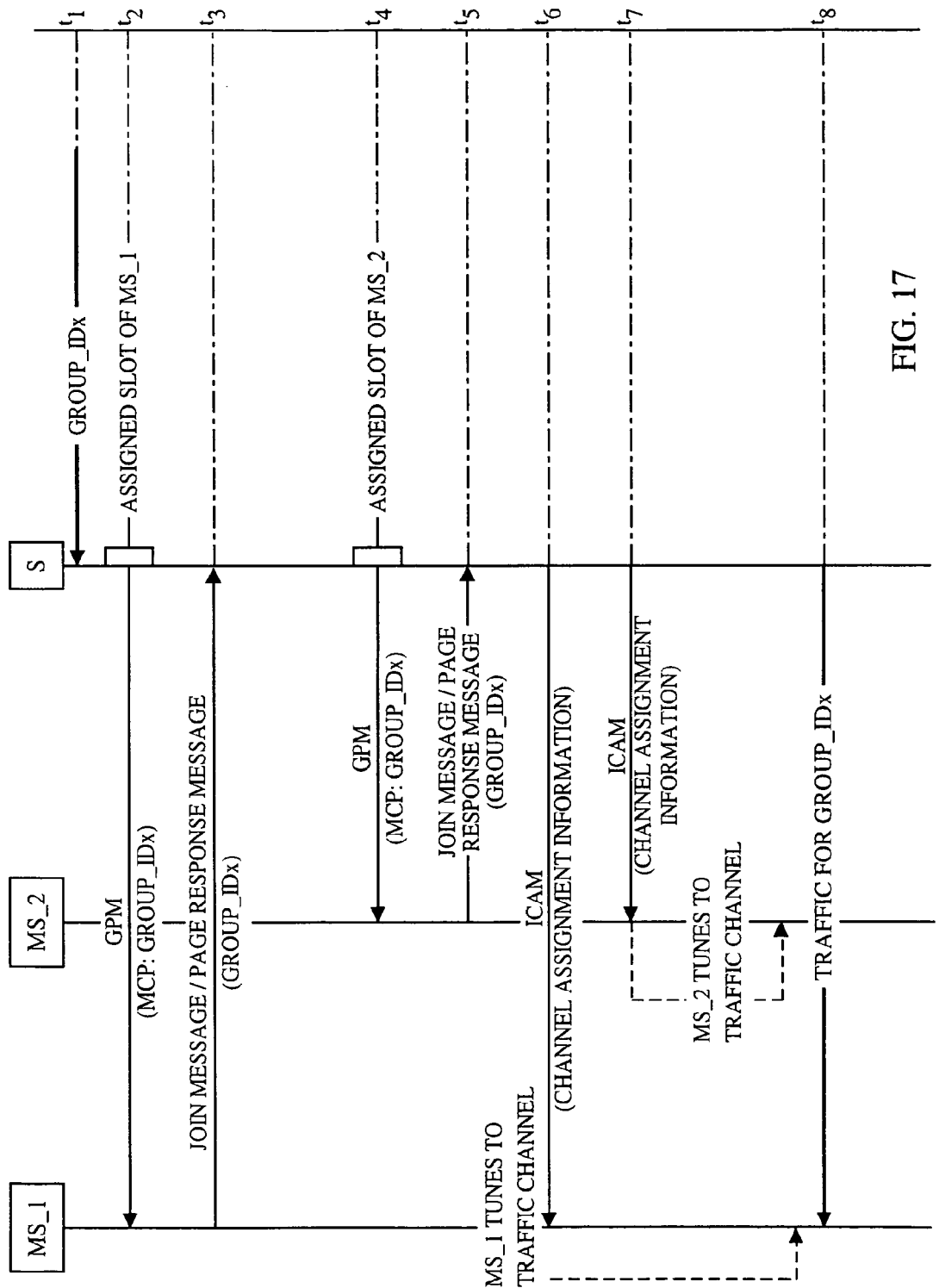
FIG. 17 illustrates a message flow in accordance with another embodiment of response/channel assignment.

An example of message flow in accordance with the above-described embodiment is illustrated in FIG. 17. At an instant $t_1$, a sector S receives an identity of the subscriber stations MS_1 and MS_2 GROUP_IDx, comprising a group with an identifier GROUP_IDx, for which a multicast call is to start. Alternatively, the sector S receives a group identifier GROUP_IDx. The information may be provided by another entity of the communication system, e.g., a base station controller, a PSTN, a source of information (not shown), an other entities. The sector S then determines the identity of the subscriber stations MS_1 and MS_2, e.g., by querying a database. The sector S then creates an individual MCP containing the identifier GROUP_IDx for each subscriber station MS_1 and MS_2, and includes the MCP into a page message, e.g. a general page message (GPM).

The sector S then determines the slots on a paging channel monitored by the member subscriber stations MS_1 and MS_2. At time $t_2$, in a slot monitored by the member subscriber stations MS_1, the sector S transmits the GPM(MCP: GROUP_IDx). Subscriber station MS_1 receives the GPM (GROUP_IDx), and sends a response at time $t_3$.

At time $t_4$, in a slot monitored by the member subscriber stations MS_2, the sector S transmits the GPM(MCP: GROUP_IDx). Subscriber station MS_2 receives the GPM (GROUP_IDx) and sends a response at time $t_5$.

Upon receiving the responses, the entity of the access network responsible for the channel assignment determines to assign shared channels. The sector S determines the method of sending the individual channel assignment message, e.g., the ICAM, to each subscriber station MS_1 and MS_2, and sends the ICAMs containing information for the shared multicast service traffic channel ICAM(Channel Assignment Information) at time $t_6$, respective $t_7$. The subscriber stations MS_1 and MS_2 process the ICAMs and take an appropriate action, e.g., tune to and start monitoring the physical channel on which the identified multicast call is being transmitted at time $t_7$. At time $t_7$ the content of the multicast service starts to be transmitted on the traffic channel (Traffic for Group_IDx).

In another embodiment, if the entity decides to assign a dedicated channels, the access network sends a common channel assignment message, Multicast Channel Assignment Message (MCAM), containing information for the dedicated multicast service traffic channel. Thus, the MCAM uses a multicast address to assign the shared channel to the interested subscriber stations.

As has been explained above, the subscriber stations belonging to the group identified by the GROUP_ID are not necessarily assigned the same slot on the paging channel. Consequently, a method enabling efficient method for delivering the multicast call initiation information is required.

In one embodiment, upon receiving the notification, the subscriber stations are required to monitor the paging channel in a non-slotted mode; consequently, the MCAM may be sent in any paging channel slot.

In another embodiment, the MCAM is sent on a slot using the same method employed for determining a slot to send a multicast-addressed notification.

In another embodiment, the common overhead message or the common page message indicates the paging channel slot number, which the subscriber stations are required to monitor for the MCAM.

In another embodiment, the MCAM is sent on each of the slots monitored by the subscriber stations.

It will be understood by one of ordinary skills in the art, that the embodiments described were treated separately for tutorial purposes only. A communication system will use an embodiment appropriate for a multicast service. The selection of the embodiment may be specified e.g., in the notification.

Once the subscriber station processes the message, the subscriber station(s) interested start to monitor the assigned channel to receive multicast service traffic.

Figure 18:
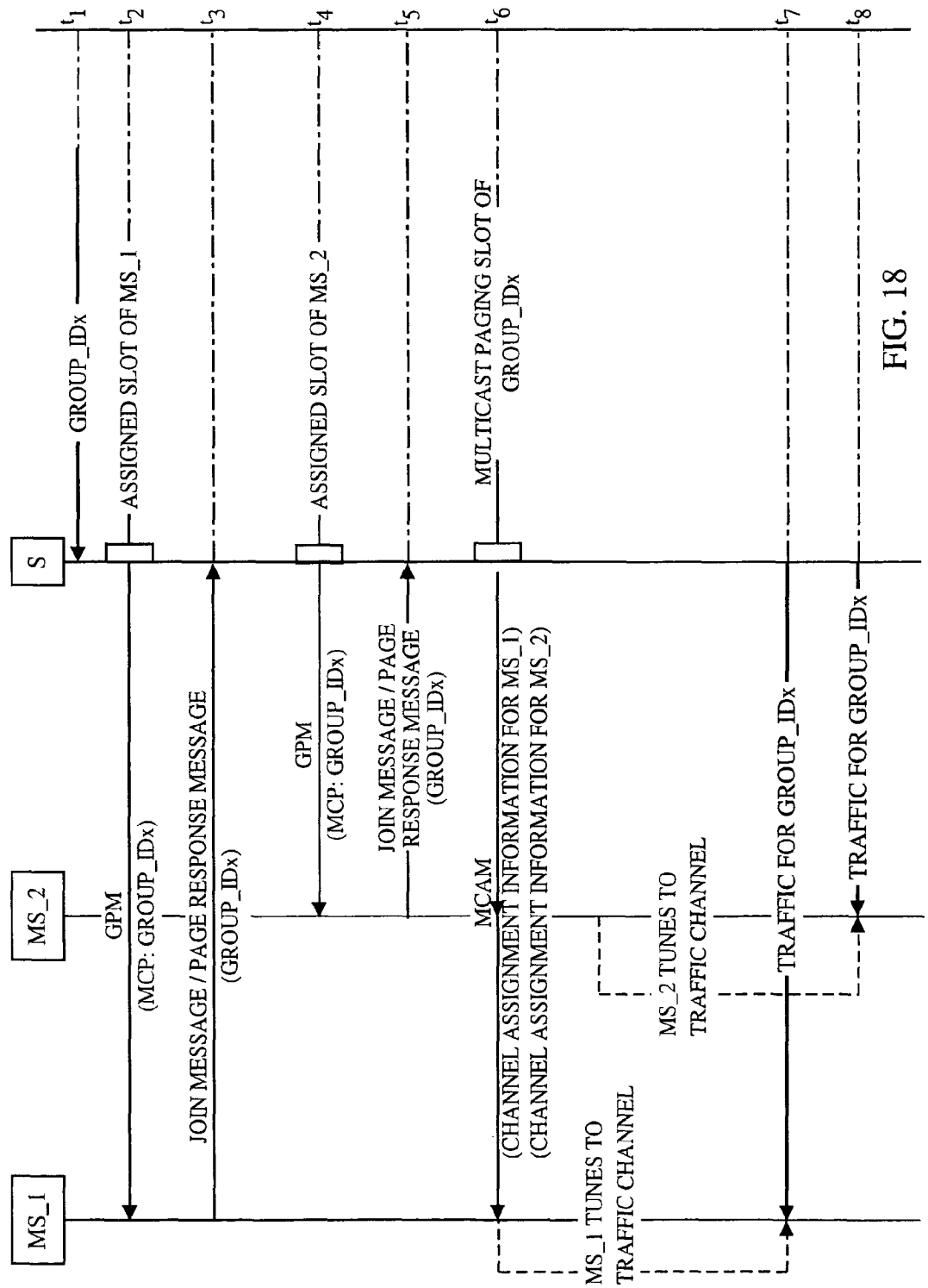
FIG. 18 illustrates a message flow in accordance with another embodiment of response/channel assignment.

An example of message flow in accordance with the above-described embodiment is illustrated in FIG. 18. At an instant $t_1$, a sector S receives an identity of the subscriber stations MS_1 and MS_2 GROUP_IDx, comprising a group with an identifier GROUP_IDx, for which a multicast call is to start. Alternatively, the sector S receives a group identifier GROUP_IDx. The information may be provided by another entity of the communication system, e.g., a base station controller, a PSTN, a source of information (not shown), an other entities. The sector S then determines the identity of the subscriber stations MS_1 and MS_2, e.g., by querying a database. The sector S then creates an individual MCP containing the identifier GROUP_IDx for each subscriber station MS_1 and MS_2, and includes the MCP into a page message, e.g. a general page message (GPM).

The sector S then determines the slots on a paging channel monitored by the member subscriber stations MS_1 and MS_2. At time $t_2$, in a slot monitored by the member subscriber stations MS_1, the sector S transmits the GPM(MCP: GROUP_IDx). Subscriber station MS_1 receives the GPM (GROUP_IDx), and sends a response at time $t_3$.

At time $t_4$, in a slot monitored by the member subscriber stations MS_2, the sector S transmits the GPM(MCP: GROUP_IDx). Subscriber station MS_2 receives the GPM (GROUP_IDx) and sends a response at time $t_5$.

Upon receiving the responses, the entity of the access network responsible for the channel assignment determines to assign dedicated channels. The sector S determines the method of sending the common channel assignment message, e.g., the MCAM, and sends the MCAM containing information for the dedicated multicast service traffic channel MCAM(Channel Assignment Information for MS_1, Channel Assignment Information for MS_2) at time $t_6$. The subscriber station MS_1 and MS_2 process the MCAM and take an appropriate action, e.g., tune to and start monitoring the dedicated physical channels Traffic for MS_1 respective Traffic for MS_2, on which the identified multicast call is being transmitted at time $t_7$ respective $t_8$.

In another embodiment, if the entity decides to assign dedicated channels, the access network sends an individual channel assignment message (Individual Channel Assignment Message—ICAM), containing information for the shared multicast service traffic channel to each responding member subscriber station. In the context of a communication system in accordance with the IS-2000 standard, the ICAM can comprise, e.g., the Extended Channel Assignment Message could be used.

It is noted that because the shared multicast service traffic channel is assigned individually as in a point-to-point call, any method known for a point-to-point traffic channel assignment can be used. Consequently, the issue of when to send the ICAM for each subscriber station is not present because the access network knows when each of the interested subscriber stations will be monitoring the paging channel.

Figure 19:
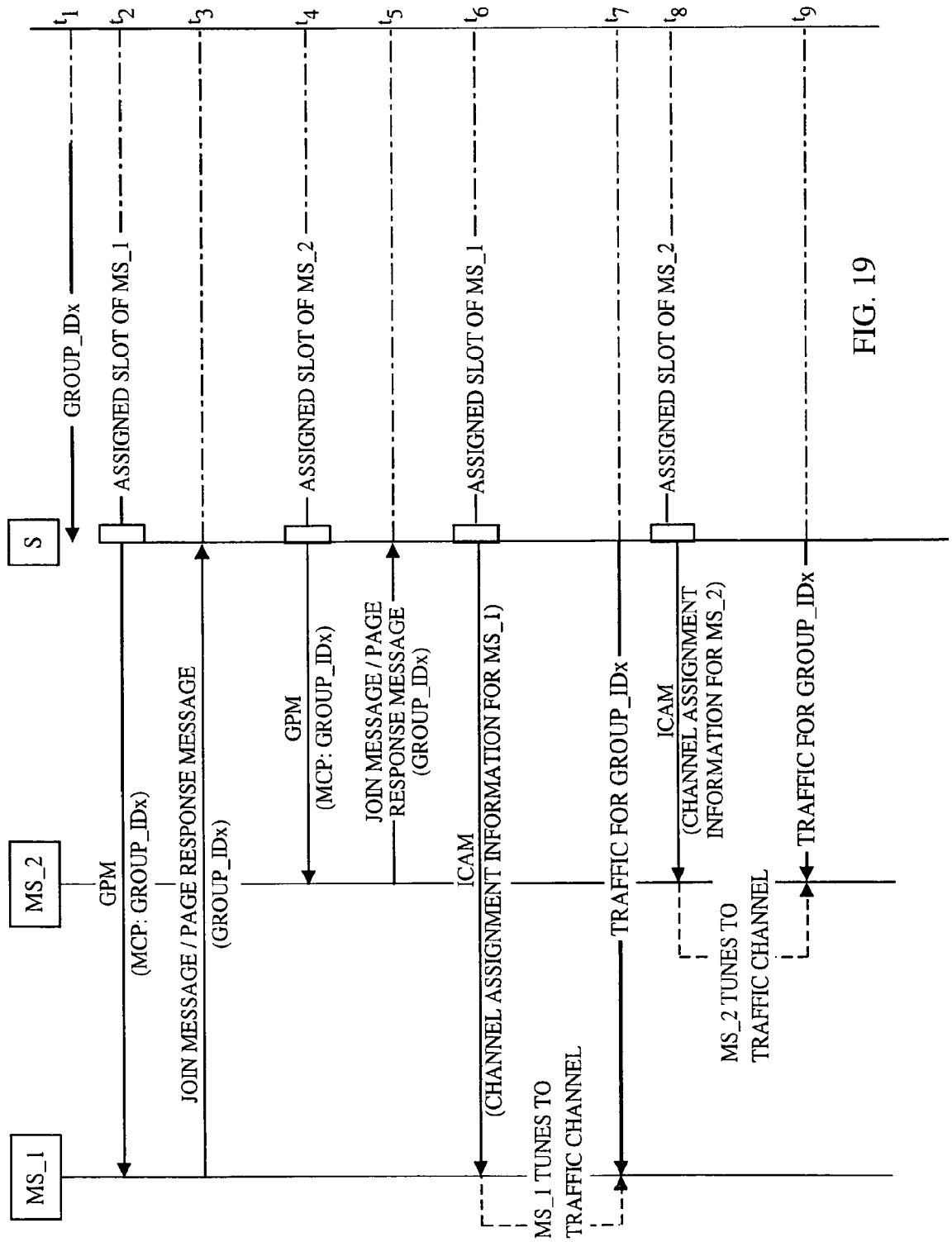
FIG. 19 illustrates a message flow in accordance with another embodiment of response/channel assignment.

An example of message flow in accordance with the above-described embodiment is illustrated in FIG. 19. At an instant $t_1$, a sector S receives an identity of the subscriber stations MS_1 and MS_2 GROUP_ID_x, comprising a group with an identifier GROUP_IDx, for which a multicast call is to start. Alternatively, the sector S receives a group identifier GROUP_IDx. The information may be provided by another entity of the communication system, e.g., a base station controller, a PSTN, a source of information (not shown), an other entities. The sector S then determines the identity of the subscriber stations MS_1 and MS_2, e.g., by querying a database. The sector S then creates an individual MCP containing the identifier GROUP_IDx for each subscriber station MS_1 and MS_2, and includes the MCP into a page message, e.g. a general page message (GPM).

The sector S then determines the slots on a paging channel monitored by the member subscriber stations MS_1 and MS_2. At time $t_2$, in a slot monitored by the member subscriber stations MS_1, the sector S transmits the GPM(MCP: GROUP_IDx). Subscriber station MS_1 receives the GPM (GROUP_IDx), and sends a response at time $t_3$.

At time $t_4$, in a slot monitored by the member subscriber stations MS_2, the sector S transmits the GPM(MCP: GROUP_IDx). Subscriber station MS_2 receives the GPM (GROUP_IDx) and sends a response at time $t_5$.

Upon receiving the responses, the entity of the access network responsible for the channel assignment determines to assign dedicated channel. The sector S waits until time $t_6$ for the paging slot monitored by the subscriber station MS_1, and then conveys the individual ICAM(Channel Assignment Information for MS_1) to the subscriber station MS_1. The subscriber station MS_1 processes the ICAM and takes an appropriate action, e.g., tunes to and starts monitoring the physical channel on which the identified multicast call for the subscriber station MS_1 is being transmitted (Traffic for MS_1) at time $t_7$.

Similarly, the sector S waits until time $t_8$ for the paging slot monitored by the subscriber station MS_2, and then conveys the individual ICAM(Channel Assignment Information for MS_2) to the subscriber station MS_2. The subscriber station MS_2 processes the ICAM and takes an appropriate action, e.g., tunes to and starts monitoring the physical channel on which the identified multicast call for the subscriber station MS_2 is being transmitted (Traffic for MS_2) at time $t_9$.

It will be understood by one of ordinary skills in the art that the above-described embodiments were treated separately for tutorial purposes only. A communication system will use any embodiment appropriate for a multicast service. For example, for a multicast call to be delivered to a multicast group whose members are in a coverage area of different sectors, each sector may use different embodiment. Thus, one sector may use multicast notification, require a response, and assign dedicated channel. Another sector may use individual notification, require a response, and assign shared channel. Yet another sector may use multicast notification, require a response, and assign a shared channel to some subscriber stations and a dedicated channel to remaining subscriber stations.

One skilled in the art will appreciate that although the flowchart diagrams are drawn in sequential order for comprehension, certain steps can be carried out in parallel in an actual implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method in a communication system, comprising:
    including an indicator into a first slot on a first channel; and
    including a multicast service notification into a message conveyed in a second slot on a second channel, the second slot corresponding to the first slot, if the multicast service notification was indicated by the indicator.

2. The method of claim 1, wherein said including an indicator into a first slot comprises:
    determining a multicast paging cycle; and
    determining the first slot in accordance with the multicast paging cycle and a multicast group identifier.

3. The method of claim 2, wherein said determining the first slot in accordance with the multicast paging cycle and a multicast group identifier comprises:
    inputting the multicast paging cycle and the multicast group identifier into a hashing function; and
    setting the first slot to a value outputted by the hashing function.

4. The method of claim 1, wherein said including a multicast service notification into a message conveyed in a second slot on a second channel comprises:
    including the multicast service notification into the message conveyed in the second slot on the second channel, the second slot being offset from the first slot by a pre-determined interval.

5. The method of claim 4, wherein said second slot is offset from the first slot by 100 milliseconds.

6. The method of claim 1, wherein the including steps are performed at a base station.

7. An apparatus in a communication system, comprising:
    means for including an indicator into a first slot on a first channel; and
    means for including a multicast service notification into a message conveyed in a second slot on a second channel, the second slot corresponding to the first slot, if the multicast service notification was indicated by the indicator.

8. The apparatus of claim 7, wherein the apparatus corresponds to a base station.

9. A non-transitory computer-readable medium containing instructions stored thereon, which, when executed by an apparatus in a communication system, cause the apparatus to perform operations, the instructions comprising:
    at least one instruction to cause the apparatus to include an indicator into a first slot on a first channel; and
    at least one instruction to cause the apparatus to include a multicast service notification into a message conveyed in a second slot on a second channel, the second slot corresponding to the first slot, if the multicast service notification was indicated by the indicator.

10. The non-transitory computer-readable medium of claim 9, wherein the apparatus corresponds to a base station.

11. A method of operating a subscriber station in a communication system, comprising:
    decoding an indicator from a first slot on a first channel; and
    decoding a multicast service notification in a second slot on a second channel, the second slot corresponding to the first slot, if the multicast service notification was indicated by the indicator.

12. The method of claim 11, wherein said decoding an indicator from a first slot on a first channel comprises:
    determining a multicast paging cycle; and
    determining the first slot in accordance with the multicast paging cycle and a multicast group identifier.

13. The method of claim 12, wherein said determining the first slot in accordance with the multicast paging cycle and a multicast group identifier comprises:
    inputting the multicast paging cycle and a multicast group identifier into a hashing function; and
    setting the first slot to a value outputted by the hashing function.

14. The method of claim 11, wherein said decoding a multicast service notification in a second slot on a second channel comprises:
    decoding the multicast service notification in the second slot, the second slot being offset from the first slot by a pre-determined interval.

15. The method of claim 14 wherein said second slot is offset from the first slot by 100 milliseconds.

16. The method of claim 11, wherein the decoding steps are performed at a subscriber station.

17. An apparatus in a communication system, comprising:
    means for decoding an indicator from a first slot on a first channel; and
    means for decoding a multicast service notification in a second slot on a second channel, the second slot corresponding to the first slot, if the multicast service notification was indicated by the indicator.

18. The apparatus of claim 17, wherein the apparatus corresponds to a subscriber station.

19. A non-transitory computer-readable medium containing instructions stored thereon, which, when executed by an apparatus in a communication system, cause the apparatus to perform operations, the instructions comprising:
at least one instruction to cause the apparatus to decode an indicator from a first slot on a first channel; and
at least one instruction to cause the apparatus to decode a multicast service notification in a second slot on a second channel, the second slot corresponding to the first slot, if the multicast service notification was indicated by the indicator.

20. The non-transitory computer-readable medium of claim 19, wherein the apparatus corresponds to a subscriber station.

21. A method of operating a subscriber station in a communication system, comprising:
determining a slot of a channel that is individually assigned to the subscriber station;
monitoring the determined slot of the channel; and
decoding an individual message conveyed in the slot and individually targeted to the subscriber station to determine if a multicast service notification was included in the individual message.

22. A subscriber station in a communication system, comprising:
a processor; and
a storage medium coupled to the processor and containing a set of instructions executable by the processor to:
determine a slot of a channel that is individually assigned to the subscriber station;
monitor the determined slot of the channel; and
decode an individual message conveyed in the slot and individually targeted to the subscriber station to determine if a multicast service notification was included in the individual message.

23. A subscriber station in a communication system, comprising:
means for determining a slot of a channel that is individually assigned to the subscriber station;
means for monitoring the determined slot of the channel; and
means for decoding an individual message conveyed in the slot and individually targeted to the subscriber station to determine if a multicast service notification was included in the individual message.

24. A non-transitory computer-readable medium containing instructions stored thereon, which, when executed by a subscriber station in a communication system, cause the subscriber station to perform operations, the instructions comprising:
at least one instruction to cause the subscriber station to determine a slot of a channel that is individually assigned to the subscriber station;
at least one instruction to cause the subscriber station to monitor the determined slot of the channel; and
at least one instruction to cause the subscriber station to decode an individual message conveyed in the slot and individually targeted to the subscriber station to determine if a multicast service notification was included in the individual message.

25. A method of operating an apparatus in a communication system, comprising:
including an indicator into a pre-determined slot on a first channel; and
including a multicast service notification into a message conveyed in a slot on a second channel, the slot corresponding to the pre-determined slot on the first channel, if the multicast service notification was indicated by the indicator.

26. The method of claim 25, wherein said including an indicator into a pre-determined slot comprises:
determining a broadcast paging cycle; and
including the indicator into an n-th slot of each broadcast paging cycle.

27. The method of claim 26, wherein said including an indicator into an n-th slot of each broadcast paging cycle comprises:
including the indicator into the first slot of each broadcast paging cycle.

28. The method of claim 25, wherein said including a multicast service notification into a message conveyed in a slot on a second channel comprises:
including the multicast service notification in the slot on the second channel, the slot being offset from the pre-determined slot on the first channel by a pre-determined interval.

29. An apparatus in a communication system, comprising:
a processor; and
a storage medium coupled to the processor and containing a set of instructions executable by the processor to:
include an indicator into a pre-determined slot on a first channel; and
include a multicast service notification into a message conveyed in a slot on a second channel, the slot corresponding to the pre-determined slot on the first channel, if the multicast service notification was indicated by the indicator.

30. The apparatus of claim 29 wherein said processor includes the indicator into the pre-determined slot by executing a set of instructions to:
determine a broadcast paging cycle; and
include the indicator into an n-th slot of each broadcast paging cycle.

31. The apparatus of claim 30, wherein said processor includes the indicator into the n-th slot of each broadcast paging cycle by executing a set of instructions to:
include the indicator into the first slot of each broadcast paging cycle.

32. The apparatus of claim 29, wherein said processor includes the multicast service notification into the message conveyed in the slot on the second channel by executing a set of instructions to
include the multicast service notification in the slot on the second channel, the slot being offset from the pre-determined slot on the first channel by a pre-determined interval.

33. The apparatus of claim 29, wherein said processor and said storage medium are disposed in a base station.

34. An apparatus in a communication system, comprising:
means for including an indicator into a pre-determined slot on a first channel; and
means for including a multicast service notification into a message conveyed in a slot on a second channel, the slot corresponding to the pre-determined slot on the first channel, if the multicast service notification was indicated by the indicator.

35. A non-transitory computer-readable medium containing instructions stored thereon, which, when executed by an apparatus in a communication system, cause the apparatus to perform operations, the instructions comprising:
- at least one instruction to cause the apparatus to include an indicator into a pre-determined slot on a first channel; and
- at least one instruction to cause the apparatus to include a multicast service notification into a message conveyed in a slot on a second channel, the slot corresponding to the pre-determined slot on the first channel, if the multicast service notification was indicated by the indicator.

36. A method of operating a subscriber station in a communication system, comprising:
- decoding an indicator from a pre-determined slot on a first channel; and
- decoding a multicast service notification in a slot on a second channel, the slot corresponding to the pre-determined slot on the first channel, if the multicast service notification was indicated by the indicator.

37. The method of claim 36, wherein said decoding an indicator from a pre-determined slot on a first channel comprises:
- determining a broadcast paging cycle; and
- decoding the indicator in an n-th slot of each broadcast paging cycle.

38. The method of claim 37, wherein said decoding an indicator in an n-th slot of each broadcast paging cycle comprises.
- decoding the indicator in a first slot of each broadcast paging cycle 39. The method of claim 36, wherein said decoding a multicast service notification in a slot on a second channel comprises:
- decoding the multicast service notification in the slot on the second channel, the slot being offset from the pre-determined slot on the first channel by a pre-determined interval.

40. A subscriber station in a communication system, comprising:
- a processor; and
- a storage medium coupled to the processor and containing a set of instructions executable by the processor to:
- decode an indicator from a pre-determined slot on a first channel; and
- decode a multicast service notification in a slot on a second channel, the slot corresponding to the pre-determined slot on the first channel, if the multicast service notification was indicated by the indicator.

41. The subscriber station of claim 40, wherein said subscriber station decodes the indicator from the pre-determined slot on a first channel by being configured to:
- determine a broadcast paging cycle; and
- decode the indicator in an n-th slot of each broadcast paging cycle.

42. The subscriber station of claim 40, wherein said subscriber station decodes the indicator in the n-th slot of each broadcast paging cycle by being configured to:
- decode the indicator in a first slot of each broadcast paging cycle.

43. The subscriber station of claim 40 wherein said subscriber station decodes the multicast service notification in the slot on the second channel by being configured to:
- decode the multicast service notification in the slot on the second channel, the slot being offset from the pre-determined slot on the first channel by a pre-determined interval.

44. A subscriber station in a communication system, comprising:
- means for decoding an indicator from a pre-determined slot on a first channel; and
- means for decoding a multicast service notification in a slot on a second channel, the slot corresponding to the pre-determined slot on the first channel, if the multicast service notification was indicated by the indicator.

45. A non-transitory computer-readable medium containing instructions stored thereon, which, when executed by a subscriber station in a communication system, cause the subscriber station to perform operations, the instructions comprising:
- at least one instruction to cause the subscriber station to decode an indicator from a pre-determined slot on a first channel; and
- at least one instruction to cause the subscriber station to decode a multicast service notification in a slot on a second channel, the slot corresponding to the pre-determined slot on the first channel, if the multicast service notification was indicated by the indicator.

46. The method of claim 1,
- wherein the indicator is a broadcast indicator that identifies whether the second channel carries any multicast pages or instead carries only one or more individual pages, and
- wherein the multicast service notification is a multicast page that is included in the message in the second slot of the second channel if the broadcast indicator identifies that the second channel carries at least one multicast page.

47. The method of claim 11,
- wherein the indicator is a broadcast indicator that identifies whether the second channel carries any multicast pages or instead carries only one or more individual pages, and
- wherein the multicast service notification is a multicast page that is included in the message in the second slot of the second channel if the broadcast indicator identifies that the second channel carries at least one multicast page.

* * * * *